US008432775B2

(12) United States Patent
Miyagoe et al.

(10) Patent No.: US 8,432,775 B2
(45) Date of Patent: Apr. 30, 2013

(54) MOTOR DRIVING CIRCUIT

(75) Inventors: Yasuhiro Miyagoe, Kyoto (JP); Yoshito Otaguro, Kyoto (JP)

(73) Assignee: Rohm Co., Ltd. (JP)

( * ) Notice: Subject to any disclaimer, the term of this patent is extended or adjusted under 35 U.S.C. 154(b) by 322 days.

(21) Appl. No.: 12/997,685

(22) PCT Filed: Jun. 2, 2009

(86) PCT No.: PCT/JP2009/002464
§ 371 (c)(1),
(2), (4) Date: Dec. 13, 2010

(87) PCT Pub. No.: WO2009/150794
PCT Pub. Date: Dec. 17, 2009

(65) Prior Publication Data
US 2011/0090775 A1     Apr. 21, 2011

(30) Foreign Application Priority Data
Jun. 13, 2008   (JP) .................................. 2008-155577

(51) Int. Cl.
*G11B 7/00*   (2006.01)
(52) U.S. Cl.
USPC .......... 369/47.38; 369/44.32; 360/69; 360/75
(58) Field of Classification Search .................. None
See application file for complete search history.

(56) References Cited

U.S. PATENT DOCUMENTS

| 6,362,929 | B1 | 3/2002 | Arai et al. |
| 6,594,102 | B1 | 7/2003 | Kanda et al. |
| 6,614,614 | B1 | 9/2003 | Murayama et al. |
| 6,639,373 | B2 * | 10/2003 | Knight et al. .................. 360/75 |
| 2001/0024339 | A1 | 9/2001 | Yaegashi |

FOREIGN PATENT DOCUMENTS

| JP | 3-207250 A | 9/1991 |
| JP | 10-243685 A | 9/1998 |
| JP | 11-75388 A | 3/1999 |
| JP | 11-167779 A | 6/1999 |

(Continued)

OTHER PUBLICATIONS

International Search Report for International Application No. PCT/JP2009/002464 with English translation mailed on Sep. 15, 2009.
Notification Concerning Transmittal of International Preliminary Report on Patentability (Chapter I of the Patent Cooperation Treaty) mailed on Dec. 23, 2010.

(Continued)

*Primary Examiner* — Muhammad N Edun
(74) *Attorney, Agent, or Firm* — Cantor Colburn LLP

(57) ABSTRACT

An SPM driver drives a spindle motor. A VCM driver drives a VCM. A DC/DC converter (switching regulator) receives a power supply voltage from an external circuit, and generates a stabilized voltage. Linear regulators each receive a power supply voltage from an external circuit, and each generates a stabilized voltage. A shock detection circuit detects vibration of a device mounting the driving circuit. A power monitoring circuit monitors the power supply voltage, and generates a power-on reset signal which is switched to a predetermined level whenever the power supply voltage is cut off. An ADC converts the back electromotive voltage that occurs at the VCM into a digital signal. A serial interface receives data from an external host processor, which is used to control the driving circuit. Cutoff circuits are arranged between the capacitors, which are to be charged using the induced current that occurs at the SPM, and the power supply terminal. When the power supply voltage is cut off, each cutoff circuit disconnects the corresponding capacitor from the power supply terminal.

4 Claims, 36 Drawing Sheets

FOREIGN PATENT DOCUMENTS

| | | |
|---|---|---|
| JP | 2000-21073 A | 1/2000 |
| JP | 2001-210030 A | 8/2001 |
| JP | 2007-312447 A | 11/2007 |
| JP | 2007-312466 A | 11/2007 |
| WO | 99/53493 A1 | 10/1999 |

OTHER PUBLICATIONS

Notification of Transmittal of Translation of the International Preliminary Report on Patentability (Chapter I or Chapter II of the Patent Cooperation Treaty) mailed Jan. 20, 2011.

* cited by examiner

FIG.2

| Pin No. | NAME | FUNCTION |
|---|---|---|
| 1 | SVM | POWER SUPPLY FOR SPM DRIVER |
| 2 | IDSADJ | RESISTOR CONNECTION TERMINAL FOR CANCELING OFFSET USED TO DETECT INDUCED VOLTAGE |
| 3 | U | U-PHASE OUTPUT OF SPM DRIVER |
| 4 | CT | CENTER TAP INPUT OF SPM DRIVER |
| 5 | V | V-PHASE OUTPUT OF SPM DRIVER |
| 6 | RNFN | NEGATIVE TERMINAL OF RESISTOR OF SPM CURRENT LOOP |
| 7 | RNFP | POSITIVE ELECTRODE OF RESISTOR OF SPM CURRENT LOOP |
| 8 | W | W-PHASE OUTPUT OF SPM DRIVER |
| 9 | GND | GROUND (SUB) |
| 10 | VCMP | VCM DRIVER OUTPUT (POSITIVE TERMINAL) |
| 11 | PGND1 | POWER GROUND OF VCM DRIVER |
| 12 | VCMN | VCM DRIVER OUTPUT (NEGATIVE TERMINAL) |
| 13 | SENN | VCM CURRENT DETECTION INPUT (POSITIVE ELECTRODE) |
| 14 | SENP | VCM CURRENT DETECTION INPUT (NEGATIVE ELECTRODE) |
| 15 | RETSEN | VCM RETRACTION DETECTION |
| 16 | VVM | POWER SUPPLY FOR VCM DRIVER |
| 17 | VRETPWR | POWER SUPPLY FOR RETRACTION OPERATION OF VCM |
| 18 | ERRO | VCM LOOP COMPENSATION AMPLIFIER OUTPUT |
| 19 | ERRI | VCM LOOP COMPENSATION AMPLIFIER INPUT |
| 20 | CSO | VCM CURRENT DETECTION AMPLIFIER OUTPUT |
| 21 | AGND | GROUND FOR ANALOG BLOCK |
| 22 | DACO | VCM 14-BIT DAC OUTPUT |
| 23 | AVCC | POWER SUPPLY FOR ANALOG BLOCK |
| 24 | VCMREF | REFERENCE VOLTAGE FOR VCM |
| 25 | ADCIN2 | ADC INPUT 1 |
| 26 | ADCIN1 | ADC INPUT 2 |
| 27 | SCGND | GROUND FOR SHOCK SENSOR |
| 28 | MUXO | ANALOG MULTIPLEXER INPUT/ADC OUTPUT |
| 29 | SCREF | REFERENCE VOLTAGE FOR SHOCK SENSOR |
| 30 | SCVCC | POWER SUPPLY FOR SHOCK SENSOR |
| 31 | SGIP | SHOCK SENSOR CHARGE AMPLIFIER INPUT (POSITIVE ELECTRODE) |
| 32 | SGIN | SHOCK SENSOR CHARGE AMPLIFIER INPUT (NEGATIVE ELECTRODE) |
| 33 | SGO | SHOCK SENSOR CHARGE AMPLIFIER OUTPUT |
| 34 | SCF1 | SHOCK SENSOR CONNECTION CAPACITOR (FIRST STAGE AMPLIFIER) FOR HPF |
| 35 | S1AMPO | SHOCK SENSOR FIRST STAGE AMPLIFIER OUTPUT |
| 36 | SCF2 | SHOCK SENSOR CONNECTION CAPACITOR (SECOND STAGE AMPLIFIER) FOR HPF |
| 37 | S2AMPO | SHOCK SENSOR SECOND STAGE AMPLIFIER OUTPUT |
| 38 | SWCO | SHOCK SENSOR WINDOW COMPARATOR OUTPUT |
| 39 | DVCC | POWER SUPPLY FOR DIGITAL BLOCK |
| 40 | FGO | OUTPUT OF SPM FREQUENCY GENERATOR |
| 41 | MCK | MASTER CLOCK INPUT |
| 42 | SCK | SERIAL CLOCK INPUT |
| 43 | SEN | SERIAL ENABLE INPUT |
| 44 | SDA | SERIAL DATA INPUT/OUTPUT |

| Pin No. | NAME | FUNCTION |
|---|---|---|
| 45 | DGND | GROUND FOR DIGITAL BLOCK |
| 46 | PORDLY | CAPACITOR CONNECTION FOR DELAYING POR |
| 47 | POROD | POWER MONITORING OUTPUT (OPEN DRAIN) |
| 48 | DAR | DRAIN CONNECTION FOR PMOS OF Ach REGULATOR |
| 49 | GAR | GATE CONNECTION FOR PMOS OF Ach REGULATOR |
| 50 | DBR | DRAIN CONNECTION FOR PMOS OF Bch REGULATOR |
| 51 | GBR | GATE CONNECTION FOR PMOS OF Bch REGULATOR |
| 52 | NEGREF | REFERENCE VOLTAGE FOR INVERTING DC/DC CONVERTER |
| 53 | NEGO | SWITCHING OUTPUT OF INVERTING DC/DC CONVERTER |
| 54 | NEGFB | FEEDBACK FOR ERROR AMPLIFIER OF INVERTING DC/DC CONVERTER |
| 55 | NEGINV | INPUT OF ERROR AMPLIFIER OF INVERTING DC/DC CONVERTER |
| 56 | DCVCC | POWER SUPPLY FOR STEP-DOWN DC/DC CONVERTER |
| 57 | DCSEN | CURRENT DETECTION INPUT OF STEP-DOWN DC/DC CONVERTER |
| 58 | DCITH | Gm AMPLIFIER OUTPUT OF STEP-DOWN DC/DC CONVERTER |
| 59 | DCO | SWITCHING OUTPUT OF STEP-DOWN DC/DC CONVERTER |
| 60 | PGND2 | GROUND FOR DC/DC CONVERTER |
| 61 | BSTFLT | CAPACITOR OF FILTERING BOOSTER |
| 62 | CP2 | CAPACITOR CONNECTION FOR CHARGE-UP Up2 |
| 63 | CP1 | CAPACITOR CONNECTION FOR CHARGE-UP Up1 |
| 64 | SRETPWR | POWER SUPPLY FOR SPM RETRACTION |

FIG.5

| CLDAC [3] | CLDAC [2] | CLDAC [1] | CLDAC [0] | SPM output current [mA] |
|---|---|---|---|---|
| 0 | 0 | 0 | 0 | 0 |
| 0 | 0 | 0 | 1 | 78.125 |
| 0 | 0 | 1 | 0 | 156.25 |
| 0 | 0 | 1 | 1 | 234.375 |
| 0 | 1 | 0 | 0 | 312.5 |
| 0 | 1 | 0 | 1 | 390.625 |
| 0 | 1 | 1 | 0 | 468.75 |
| 0 | 1 | 1 | 1 | 546.875 |
| 1 | 0 | 0 | 0 | 625.0 |
| 1 | 0 | 0 | 1 | 703.125 |
| 1 | 0 | 1 | 0 | 781.25 |
| 1 | 0 | 1 | 1 | 859.375 |
| 1 | 1 | 0 | 0 | 937.5 |
| 1 | 1 | 0 | 1 | 1015.625 |
| 1 | 1 | 1 | 0 | 1093.75 |
| 1 | 1 | 1 | 1 | 1171.875 |

FIG.22

| SSG[3] | SSG[2] | SSG[1] | SSG[0] | 2nd stage amplifier gain[dB] |
|---|---|---|---|---|
| 0 | 0 | 0 | 0 | 2 |
| 0 | 0 | 0 | 1 | 4 |
| 0 | 0 | 1 | 0 | 6 |
| 0 | 0 | 1 | 1 | 8 |
| 0 | 1 | 0 | 0 | 10 |
| 0 | 1 | 0 | 1 | 12 |
| 0 | 1 | 1 | 0 | 14 |
| 0 | 1 | 1 | 1 | 16 |
| 1 | 0 | 0 | 0 | 18 |
| 1 | 0 | 0 | 1 | 20 |
| 1 | 0 | 1 | 0 | 22 |
| 1 | 0 | 1 | 1 | 24 |
| 1 | 1 | 0 | 0 | 26 |
| 1 | 1 | 0 | 1 | 28 |
| 1 | 1 | 1 | 0 | 30 |
| 1 | 1 | 1 | 1 | 32 |

FIG.24

| AMS[3] | AMS[2] | AMS[1] | AMS[0] | Analog Multiplexer channel select | Comment |
|---|---|---|---|---|---|
| 0 | 0 | 0 | 0 | 3.2V - 1.2V ADC Input | for ADC external input |
| 0 | 0 | 0 | 1 | 2V - 0V ADC Input | for ADC external input |
| 0 | 0 | 1 | 0 | VBG | Band-gap reference voltage |
| 0 | 0 | 1 | 1 | VREF1 | Reference voltage 1V |
| 0 | 1 | 0 | 0 | DAC REFH | Reference voltage 3.2V |
| 0 | 1 | 0 | 1 | DAC REFL | Reference voltage 1.2V |
| 0 | 1 | 1 | 0 | VREF2 | Reference voltage 2V |
| 0 | 1 | 1 | 1 | SFO | Shock sensor L.P.F. output |
| 1 | 0 | 0 | 0 | S2O | Shock sensor 2nd Amp output |
| 1 | 0 | 0 | 1 | BEMFO | VCM BEMF monitor output |
| 1 | 0 | 1 | 0 | CLDAC | SPM current limit DAC output |
| 1 | 0 | 1 | 1 | TSDVF | Thermal VF monitor |
| 1 | 1 | 0 | 0 | S1O | Shock sensor 1st Amp output |
| 1 | 1 | 0 | 1 | BEMF1 | VCM BEMF 1st Amp output |
| 1 | 1 | 1 | 0 | - | - |
| 1 | 1 | 1 | 1 | - | - |

FIG.27

| Parameter | Symbol | Unit | Min | Typ | Max |
|---|---|---|---|---|---|
| SCK Frequency | Tclk | nsec | 30 | | |
| SCK Pulse Width Low | Tckl | nsec | 13 | | |
| SCK Pulse Width High | Tckh | nsec | 13 | | |
| SEN Setup Time | Tses | nsec | 15 | | |
| SEN Hold Time | Tseh | nsec | 15 | | |
| SEN High Time (Disable Time) | Tsh | nsec | 30 | | |
| SDA Setup Time (WRITE Mode) | Tsds | nsec | 7.5 | | |
| SDA Hold Time (WRITE Mode) | Tsdh | nsec | 7.5 | | |
| SDA Delay Time (READ Mode) | Tdelay | nsec | 2 | | 15 *1 |
| SDA Hold Time (READ Mode) | Tsdhr | nsec | 2 | | 15 *1 |

Note : All specifications are in respect to 50% of the signal switching threshold.
*1 : With Cload = 33pF

FIG.28

|  | PTS1 | PTS0 | TBLS | R/W | ADDR2 | ADDR1 | ADDR0 | Sub System |
|---|---|---|---|---|---|---|---|---|
|  |  |  |  | 15 | 14 | 13 | 12 |  |
| PORT0 | x | x | x | 0 | 0 | 0 | 0 | General |
| PORT1 | x | x | x | 0 | 0 | 0 | 1 | VCM |
| PORT2 | x | x | 0 | 0 | 0 | 1 | 0 | VCM, Shock, REG |
| PORT3 | x | x | 0 | 0 | 0 | 1 | 1 | SPM |
| PORT4 | 0 | 0 | 0 | 0 | 1 | 0 | 0 | ADC |
| PORT5 | 0 | 0 | 0 | 0 | 1 | 0 | 1 | VCM |
| PORT6 | 0 | 0 | 0 | 0 | 1 | 1 | 0 | - |
| PORT7 | 0 | 0 | 0 | 0 | 1 | 1 | 1 | Retract, General |
| PORT8 | 0 | 1 | 0 | 0 | 1 | 0 | 0 | SPM |
| PORT9 | 0 | 1 | 0 | 0 | 1 | 0 | 1 | SPM |
| PORT10 | 0 | 1 | 0 | 0 | 1 | 1 | 0 | SPM |
| PORT11 | 0 | 1 | 0 | 0 | 1 | 1 | 1 | SPM |
| PORT12 | x | x | 0 | 1 | 0 | 0 | 0 | - |
| PORT13 | x | x | 0 | 1 | 0 | 0 | 1 | - |
| PORT14 | x | x | 0 | 1 | 0 | 1 | 0 | - |
| PORT15 | x | x | 0 | 1 | 0 | 1 | 1 | SPM |
| PORT16 | x | 0 | 0 | 1 | 1 | 0 | 0 | ADC,TSD |
| PORT17 | x | 0 | 0 | 1 | 1 | 0 | 1 | VCM |
| PORT18 | x | 0 | 0 | 1 | 1 | 1 | 0 | - |
| PORT19 | x | 0 | 0 | 1 | 1 | 1 | 1 | - |
| PORT20 | x | 1 | 0 | 1 | 1 | 0 | 0 | SPM |
| PORT21 | x | 1 | 0 | 1 | 1 | 0 | 1 | Revision, Reg |
| PORT22 | x | 1 | 0 | 1 | 1 | 1 | 0 | - |
| PORT23 | x | 1 | 0 | 1 | 1 | 1 | 1 | - |
| PORT24 | 1 | x | 0 | 0 | 1 | 0 | 0 | Test Mode |
| PORT25 | 1 | x | 0 | 0 | 1 | 0 | 1 | Test Mode |
| PORT26 | 1 | x | 0 | 0 | 1 | 1 | 0 | Test Mode |
| PORT27 | 1 | x | 0 | 0 | 1 | 1 | 1 | Test Mode |

FIG.29

| PORT | DATA | | | | | | | | | | | |
|---|---|---|---|---|---|---|---|---|---|---|---|---|
| | 11 | 10 | 9 | 8 | 7 | 6 | 5 | 4 | 3 | 2 | 1 | 0 |
| PORT0 | TBLS | SHCKEN | VCMBRK | VCMEN | SPMCST | SPMBRK | PTS1 | PTS0 | EXCOM | SPMEN | PS1 | PS0 |
| PORT1 | LDBEN | LDAEN | DAC9 | DAC8 | DAC7 | DAC6 | DAC5 | DAC4 | DAC3 | DAC2 | DAC1 | DAC0 |
| PORT2 | NEGEN | DCEN | SSG3 | SSG2 | SSG1 | SSG0 | LPFS1 | LPFS0 | DAC13 | DAC12 | DAC11 | DAC10 |
| PORT3 | | | Reserved | Reserved | KVAL7 | KVAL6 | KVAL5 | KVAL4 | KVAL3 | KVAL2 | KVAL1 | KVAL0 |
| PORT4 | | | | | | ADCEN | ADS1 | ADS0 | AMS3 | AMS2 | AMS1 | AMS0 |
| PORT5 | | BEOFSEN | BEG1 | BEG0 | BEOFSR7 | BEOFSR6 | BEOFSR5 | BEOFSR4 | BEOFSR3 | BEOFSR2 | BEOFSR1 | BEOFSR0 |
| PORT6 | | | | | | | | | | | Reserved | Reserved |
| PORT7 | | | DT | RETBRK | BDT2 | BDT1 | BDT0 | RT4 | RT3 | RT2 | RT1 | RT0 |
| PORT8 | TBLSET | | CLDAC3 | CLDAC2 | CLDAC1 | CLDAC0 | IDSEN | WDWS4 | WDWS3 | WDWS2 | WDWS1 | WDWS0 |
| PORT9 | | | | | FGS1 | FGS0 | AVE1 | AVE0 | Reserved | Reserved | Reserved | Reserved |
| PORT10 | | CDT10 | CDT9 | CDT8 | CDT7 | CDT6 | CDT5 | CDT4 | CDT3 | CDT2 | CDT1 | CDT0 |
| PORT11 | MSK11 | MSK10 | MSK9 | MSK8 | MSK7 | MSK6 | MSK5 | MSK4 | MSK3 | MSK2 | MSK1 | MSK0 |
| PORT12 | ↑ | ↑ | ↑ | ↑ | ↑ | ↑ | ↑ | ↑ | ↑ | ↑ | ↑ | ↑ |
| PORT13 | ↑ | ↑ | ↑ | ↑ | ↑ | ↑ | ↑ | ↑ | ↑ | ↑ | ↑ | ↑ |
| PORT14 | ↑ | ↑ | ↑ | ↑ | ↑ | ↑ | ↑ | ↑ | ↑ | ↑ | ↑ | ↑ |
| PORT15 | SADCONV | | ↑ | ↑ | SADC7 | SADC6 | SADC5 | SADC4 | SADC3 | SADC2 | SADC1 | SADC0 |
| PORT16 | TWARN | ADCONV | ADC9 | ADC8 | ADC7 | ADC6 | ADC5 | ADC4 | ADC3 | ADC2 | ADC1 | ADC0 |
| PORT17 | | ↑ | ↑ | ↑ | BEOFSD7 | BEOFSD6 | BEOFSD5 | BEOFSD4 | BEOFSD3 | BEOFSD2 | BEOFSD1 | BEOFSD0 |
| PORT18 | | | | | | | | | | | ↑ | ↑ |
| PORT19 | | | ↑ | ↑ | ↑ | ↑ | ↑ | ↑ | ↑ | ↑ | ↑ | ↑ |
| PORT20 | IDSD | IDSFLT | ↑ | ↑ | ↑ | ↑ | ↑ | ↑ | ↑ | ↑ | ↑ | ↑ |
| PORT21 | REV2 | REV1 | REV0 | NSCP | ↑ | ↑ | ↑ | ↑ | ↑ | ↑ | ↑ | ↑ |
| PORT22 | | ↑ | ↑ | ↑ | ↑ | ↑ | ↑ | ↑ | ↑ | ↑ | ↑ | ↑ |
| PORT23 | ↑ | ↑ | ↑ | ↑ | ↑ | ↑ | ↑ | ↑ | ↑ | ↑ | ↑ | ↑ |
| PORT24 | Reserved | Reserved | Reserved | Reserved | Reserved | Reserved | Reserved | Reserved | Reserved | Reserved | Reserved | Reserved |
| PORT25 | Reserved | Reserved | Reserved | Reserved | Reserved | Reserved | Reserved | Reserved | Reserved | Reserved | Reserved | Reserved |
| PORT26 | Reserved | Reserved | Reserved | Reserved | Reserved | Reserved | Reserved | Reserved | Reserved | Reserved | Reserved | Reserved |
| PORT27 | Reserved | Reserved | Reserved | Reserved | Reserved | Reserved | Reserved | Reserved | Reserved | Reserved | Reserved | Reserved |

FIG.30A

| Bit # | Name | Sub System | Description | 0 | 1 |
|---|---|---|---|---|---|
| 0 | PS0 | General | Power Save Mode 0 | FIG. 35C | |
| 1 | PS1 | General | Power Save Mode 1 | FIG. 35C | |
| 2 | SPMEN | SPM | SPM Driver Enable | Disable | Enable |
| 3 | EXCOM | SPM | SPM External Commutation | - | - |
| 4 | PTS0 | General | Port Select 0 | FIG. 28 | |
| 5 | PTS1 | General | Port Select 1 | FIG. 28 | |
| 6 | SPMBRK | SPM | SPM Brake | Disable | Enable |
| 7 | SPMCST | SPM | SPM Coast | Disable | Enable |
| 8 | VCMEN | VCM | VCM Driver Enable | Disable | Enable |
| 9 | VCMBRK | VCM | VCM Brake Enable | Disable | Enable |
| 10 | SHCKEN | SHOCK | Shock Sensor Amp Enable | Disable | Enable |
| 11 | TBLS | SPM | SPM Sine Table Write Enable | Disable | Enable |

PORT0 definition

FIG.30B

| Bit # | Name | Sub System | Description | 0 | 1 |
|---|---|---|---|---|---|
| 0 | DAC0 | VCM | VCM Control Data (14 bit DAC Data) 0 | - | - |
| 1 | DAC1 | VCM | VCM Control Data (14 bit DAC Data) 1 | - | - |
| 2 | DAC2 | VCM | VCM Control Data (14 bit DAC Data) 2 | - | - |
| 3 | DAC3 | VCM | VCM Control Data (14 bit DAC Data) 3 | - | - |
| 4 | DAC4 | VCM | VCM Control Data (14 bit DAC Data) 4 | - | - |
| 5 | DAC5 | VCM | VCM Control Data (14 bit DAC Data) 5 | - | - |
| 6 | DAC6 | VCM | VCM Control Data (14 bit DAC Data) 6 | - | - |
| 7 | DAC7 | VCM | VCM Control Data (14 bit DAC Data) 7 | - | - |
| 8 | DAC8 | VCM | VCM Control Data (14 bit DAC Data) 8 | - | - |
| 9 | DAC9 | VCM | VCM Control Data (14 bit DAC Data) 9 | - | - |
| 10 | LDAEN | REG | Ach LDO Enable | Enable | Disable |
| 11 | LDBEN | REG | Bch LDO Enable | Enable | Disable |

PORT1 definition

FIG.30C

| Bit # | Name | Sub System | Description | 0 | 1 |
|---|---|---|---|---|---|
| 0 | DAC10 | VCM | VCM Control Data (14 bit DAC Data) 10 | - | - |
| 1 | DAC11 | VCM | VCM Control Data (14 bit DAC Data) 11 | - | - |
| 2 | DAC12 | VCM | VCM Control Data (14 bit DAC Data) 12 | - | - |
| 3 | DAC13 | VCM | VCM Control Data (14 bit DAC Data) 13 | - | - |
| 4 | LPFS0 | SHOCK | LPF Cut Off Frequency Setting 0 | | |
| 5 | LPFS1 | SHOCK | LPF Cut Off Frequency Setting 1 | | |
| 6 | SSG0 | SHOCK | Shock Sensor Amp Gain Setting 0 | FIG. 22 | |
| 7 | SSG1 | SHOCK | Shock Sensor Amp Gain Setting 1 | FIG. 22 | |
| 8 | SSG2 | SHOCK | Shock Sensor Amp Gain Setting 2 | FIG. 22 | |
| 9 | SSG3 | SHOCK | Shock Sensor Amp Gain Setting 3 | FIG. 22 | |
| 10 | DCEN | REG | Step-Down DC/DC Converter Enable | Enable | Disable |
| 11 | NEGEN | REG | Inverting DC/DC Converter Enable | Disable | Enable |

PORT2 definition

FIG.31A

| Bit # | Name | Sub System | Description | 0 | 1 |
|---|---|---|---|---|---|
| 0 | KVAL0 | SPM | SPM Torque Data for Speed Control 0 | - | - |
| 1 | KVAL1 | SPM | SPM Torque Data for Speed Control 1 | - | - |
| 2 | KVAL2 | SPM | SPM Torque Data for Speed Control 2 | - | - |
| 3 | KVAL3 | SPM | SPM Torque Data for Speed Control 3 | - | - |
| 4 | KVAL4 | SPM | SPM Torque Data for Speed Control 4 | - | - |
| 5 | KVAL5 | SPM | SPM Torque Data for Speed Control 5 | - | - |
| 6 | KVAL6 | SPM | SPM Torque Data for Speed Control 6 | - | - |
| 7 | KVAL7 | SPM | SPM Torque Data for Speed Control 7 | - | - |
| 8 | Reserved | - | | | - |
| 9 | Reserved | - | | | - |
| 10 | | | | | |
| 11 | | | | | |

PORT3 definition

FIG.31B

| Bit # | Name | Sub System | Description | 0 | 1 |
|---|---|---|---|---|---|
| 0 | AMS0 | General | Analog Multiplex Select 0 | FIG. 24 | |
| 1 | AMS1 | General | Analog Multiplex Select 1 | FIG. 24 | |
| 2 | AMS2 | General | Analog Multiplex Select 2 | FIG. 24 | |
| 3 | AMS3 | General | Analog Multiplex Select 3 | FIG. 24 | |
| 4 | ADS0 | ADC | ADC Input Channel Select 0 | FIG. 24 | |
| 5 | ADS1 | ADC | ADC Input Channel Select 1 | FIG. 24 | |
| 6 | ADCEN | ADC | 10bit A/D Converter Enable | Disable | Enable |
| 7 | | | | | |
| 8 | | | | | |
| 9 | | | | | |
| 10 | | | | | |
| 11 | | | | | |

PORT4 definition

FIG.31C

| Bit # | Name | Sub System | Description | 0 | 1 |
|---|---|---|---|---|---|
| 0 | BEOFSR0 | VCM | BEMF Offset Cancel Resistance 0 | See Note1 | |
| 1 | BEOFSR1 | VCM | BEMF Offset Cancel Resistance 1 | See Note1 | |
| 2 | BEOFSR2 | VCM | BEMF Offset Cancel Resistance 2 | See Note1 | |
| 3 | BEOFSR3 | VCM | BEMF Offset Cancel Resistance 3 | See Note1 | |
| 4 | BEOFSR4 | VCM | BEMF Offset Cancel Resistance 4 | See Note1 | |
| 5 | BEOFSR5 | VCM | BEMF Offset Cancel Resistance 5 | See Note1 | |
| 6 | BEOFSR6 | VCM | BEMF Offset Cancel Resistance 6 | See Note1 | |
| 7 | BEOFSR7 | VCM | BEMF Offset Cancel Resistance 7 | See Note1 | |
| 8 | BEG0 | VCM | BEMF Amp Gain 0 | | |
| 9 | BEG1 | VCM | BEMF Amp Gain 1 | | |
| 10 | BEOFSEN | VCM | BEMF Offset Cancel Internal / External Select | Internal | External |
| 11 | | | | | |

PORT5 definition

FIG.32A

| Bit # | Name | Sub System | Description | 0 | 1 |
|---|---|---|---|---|---|
| 0 | Reserved | – | | – | – |
| 1 | Reserved | – | | – | – |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |

PORT6 definition

FIG.32B

| Bit # | Name | Sub System | Description | 0 | 1 |
|---|---|---|---|---|---|
| 0 | RT0 | Retract | 1st Retract Time Setting Data 0 | See Note2 | |
| 1 | RT1 | Retract | 1st Retract Time Setting Data 1 | See Note2 | |
| 2 | RT2 | Retract | 1st Retract Time Setting Data 2 | See Note2 | |
| 3 | RT3 | Retract | 1st Retract Time Setting Data 3 | See Note2 | |
| 4 | RT4 | Retract | 1st Retract Time Setting Data 4 | See Note2 | |
| 5 | BDT0 | Retract | Brake Delay Time Setting Data 0 | See Note2 | |
| 6 | BDT1 | Retract | Brake Delay Time Setting Data 1 | See Note2 | |
| 7 | BDT2 | Retract | Brake Delay Time Setting Data 2 | See Note2 | |
| 8 | RETBRK | Retract | After RETRACT Brake Enable | Disable | Enable |
| 9 | DT0 | General | Master Clock 1/2 Dividing Enable | Disable | Enable |
| 10 | | | | | |
| 11 | | | | | |

PORT7 definition

FIG.32C

| Bit # | Name | Sub System | Description | 0 | 1 |
|---|---|---|---|---|---|
| 0 | WDWS0 | SPM | SPM BEMF Detect Window Setting 0 | See Note5 | |
| 1 | WDWS1 | SPM | SPM BEMF Detect Window Setting 1 | See Note5 | |
| 2 | WDWS2 | SPM | SPM BEMF Detect Window Setting 2 | See Note5 | |
| 3 | WDWS3 | SPM | SPM BEMF Detect Window Setting 3 | See Note5 | |
| 4 | WDWS4 | SPM | SPM BEMF Detect Window Setting 4 | See Note5 | |
| 5 | IDSEN | SPM | SPM Inductive Sense Enable | Disable | Enable |
| 6 | CLDAC0 | SPM | SPM Current Limit DAC Setting 0 | FIG. 5 | |
| 7 | CLDAC1 | SPM | SPM Current Limit DAC Setting 1 | FIG. 5 | |
| 8 | CLDAC2 | SPM | SPM Current Limit DAC Setting 2 | FIG. 5 | |
| 9 | CLDAC3 | SPM | SPM Current Limit DAC Setting 3 | FIG. 5 | |
| 10 | | | | | |
| 11 | TBLSET | SPM | SPM Sine Lookup Table Initialize | Normal | Initialize |

PORT8 definition

FIG.33A (Serial Interface, cont.)

| Bit # | Name | Sub System | Description | 0 | 1 |
|---|---|---|---|---|---|
| 0 | Reserved | – | | | – |
| 1 | Reserved | – | | | – |
| 2 | Reserved | – | | | – |
| 3 | Reserved | – | | | – |
| 4 | AVES0 | SPM | SPM BEMF Detect FLL Smoothing Gain Setting 0 | | |
| 5 | AVES1 | SPM | SPM BEMF Detect FLL Smoothing Gain Setting 1 | | |
| 6 | FGS0 | SPM | SPM FG Select 0 | | FIG. 36 |
| 7 | FGS1 | SPM | SPM FG Select 1 | | FIG. 36 |
| 8 | | | | | |
| 9 | | | | | |
| 10 | | | | | |
| 11 | | | | | |

PORT9 definition

FIG.33B

| Bit # | Name | Sub System | Description | 0 | 1 |
|---|---|---|---|---|---|
| 0 | CDT0 | SPM | Commutation Delay Time Setting 0 | | See Note3 |
| 1 | CDT1 | SPM | Commutation Delay Time Setting 1 | | See Note3 |
| 2 | CDT2 | SPM | Commutation Delay Time Setting 2 | | See Note3 |
| 3 | CDT3 | SPM | Commutation Delay Time Setting 3 | | See Note3 |
| 4 | CDT4 | SPM | Commutation Delay Time Setting 4 | | See Note3 |
| 5 | CDT5 | SPM | Commutation Delay Time Setting 5 | | See Note3 |
| 6 | CDT6 | SPM | Commutation Delay Time Setting 6 | | See Note3 |
| 7 | CDT7 | SPM | Commutation Delay Time Setting 7 | | See Note3 |
| 8 | CDT8 | SPM | Commutation Delay Time Setting 8 | | See Note3 |
| 9 | CDT9 | SPM | Commutation Delay Time Setting 9 | | See Note3 |
| 10 | CDT10 | SPM | Commutation Delay Time Setting 10 | | See Note3 |
| 11 | | | | | |

PORT10 definition

FIG.33C

| Bit # | Name | Sub System | Description | 0 | 1 |
|---|---|---|---|---|---|
| 0 | MSK0 | SPM | BEMF Masking Time Setting 0 | | See Note4 |
| 1 | MSK1 | SPM | BEMF Masking Time Setting 1 | | See Note4 |
| 2 | MSK2 | SPM | BEMF Masking Time Setting 2 | | See Note4 |
| 3 | MSK3 | SPM | BEMF Masking Time Setting 3 | | See Note4 |
| 4 | MSK4 | SPM | BEMF Masking Time Setting 4 | | See Note4 |
| 5 | MSK5 | SPM | BEMF Masking Time Setting 5 | | See Note4 |
| 6 | MSK6 | SPM | BEMF Masking Time Setting 6 | | See Note4 |
| 7 | MSK7 | SPM | BEMF Masking Time Setting 7 | | See Note4 |
| 8 | MSK8 | SPM | BEMF Masking Time Setting 8 | | See Note4 |
| 9 | MSK9 | SPM | BEMF Masking Time Setting 9 | | See Note4 |
| 10 | MSK10 | SPM | BEMF Masking Time Setting 10 | | See Note4 |
| 11 | MSK11 | SPM | BEMF Masking Time Setting 11 | | See Note4 |

PORT11 definition

FIG.34A

| Bit # | Name | Sub System | Description | 0 | 1 |
|---|---|---|---|---|---|
| 0 | SADC0 | SPM | SPM ADC Output Data 0 (LSB) | – | – |
| 1 | SADC1 | SPM | SPM ADC Output Data 1 | – | – |
| 2 | SADC2 | SPM | SPM ADC Output Data 2 | – | – |
| 3 | SADC3 | SPM | SPM ADC Output Data 3 | – | – |
| 4 | SADC4 | SPM | SPM ADC Output Data 4 | – | – |
| 5 | SADC5 | SPM | SPM ADC Output Data 5 | – | – |
| 6 | SADC6 | SPM | SPM ADC Output Data 6 | – | – |
| 7 | SADC7 | SPM | SPM ADC Output Data 7 (MSB) | – | – |
| 8 | | | | – | – |
| 9 | | | | – | – |
| 10 | | | | – | – |
| 11 | SADCONV | SPM | SPM ADC Conversion End | Converting | Finish |

PORT15 (Read) definition

FIG.34B

| Bit # | Name | Sub System | Description | 0 | 1 |
|---|---|---|---|---|---|
| 0 | ADC0 | ADC | ADC Output Data 0 (LSB) | – | – |
| 1 | ADC1 | ADC | ADC Output Data 1 | – | – |
| 2 | ADC2 | ADC | ADC Output Data 2 | – | – |
| 3 | ADC3 | ADC | ADC Output Data 3 | – | – |
| 4 | ADC4 | ADC | ADC Output Data 4 | – | – |
| 5 | ADC5 | ADC | ADC Output Data 5 | – | – |
| 6 | ADC6 | ADC | ADC Output Data 6 | – | – |
| 7 | ADC7 | ADC | ADC Output Data 7 | – | – |
| 8 | ADC8 | ADC | ADC Output Data 8 | – | – |
| 9 | ADC9 | ADC | ADC Output Data 9 (MSB) | – | – |
| 10 | ADCONV | ADC | ADC Conversion End | Converting | Finish |
| 11 | TWARN | ADC | Thermal Warning | Normal | Warning |

PORT16 (Read) definition

FIG.34C

| Bit # | Name | Sub System | Description | 0 | 1 |
|---|---|---|---|---|---|
| 0 | BEOFSD0 | VCM | BEMF Offset Cancel Data 0 (LSB) | – | – |
| 1 | BEOFSD1 | VCM | BEMF Offset Cancel Data 1 | – | – |
| 2 | BEOFSD2 | VCM | BEMF Offset Cancel Data 2 | – | – |
| 3 | BEOFSD3 | VCM | BEMF Offset Cancel Data 3 | – | – |
| 4 | BEOFSD4 | VCM | BEMF Offset Cancel Data 4 | – | – |
| 5 | BEOFSD5 | VCM | BEMF Offset Cancel Data 5 | – | – |
| 6 | BEOFSD6 | VCM | BEMF Offset Cancel Data 6 | – | – |
| 7 | BEOFSD7 | VCM | BEMF Offset Cancel Data 7 (MSB) | – | – |
| 8 | | | | | |
| 9 | | | | | |
| 10 | | | | | |
| 11 | | | | | |

PORT17 (Read) definition

FIG.35A (Serial Interface, cont.)

| Bit # | Name | Sub System | Description | 0 | 1 |
|---|---|---|---|---|---|
| 0 | | | | | |
| 1 | | | | | |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | IDSFLT | SPM | Inductive Sense Fault | Sensing | Fault |
| 11 | IDSD | SPM | Inductive Sense Finish | Sensing | Succeed |

PORT20 (Read) definition

FIG.35B

| Bit # | Name | Sub System | Description | 0 | 1 |
|---|---|---|---|---|---|
| 0 | | | | | |
| 1 | | | | | |
| 2 | | | | | |
| 3 | | | | | |
| 4 | | | | | |
| 5 | | | | | |
| 6 | | | | | |
| 7 | | | | | |
| 8 | NSCP | REG | Inverting DC/DC Converter Short Connect Protect | Normal | Short |
| 9 | REV0 | General | Chip Revision 0 | - | - |
| 10 | REV1 | General | Chip Revision 1 | - | - |
| 11 | REV2 | General | Chip Revision 2 | - | - |

PORT21 (Read) definition

FIG.35C

| MODE | PS1 | PS0 | POR VBG Ach,Bch DC/DC | Booster | SPM ADC | VCM RETRACT Shock Sensor Inv DC/DC |
|---|---|---|---|---|---|---|
| MODE0 | 0 | 0 | ON | OFF | OFF | OFF |
| MODE1 | 0 | 1 | ON | ON | OFF | OFF |
| MODE2 | 1 | 0 | ON | ON | ON | OFF |
| MODE3 | 1 | 1 | ON | ON | ON | ON |

Power Save Mode

FIG.36

| FGS [1] | FGS [0] | FG Pulse |
|---|---|---|
| 0 | 0 | Electrical 360 degree |
| 0 | 1 | Electrical 60 degree |
| 1 | 0 | Mechanical 360 degree |
| 1 | 1 | Test Mode |

SPM FG output select

MOTOR DRIVING CIRCUIT

CROSS REFERENCE TO RELATED APPLICATIONS

This is a U.S. national stage application of International Application No. PCT/JP2009/002464, filed on 2 Jun. 2009. Priority under 35 U.S.C. §119(a) and 35 U.S.C. §365(b) is claimed from Japanese Application No. JP2008-155577, filed 13 Jun. 2008, the disclosure of which is also incorporated herein by reference.

BACKGROUND OF THE INVENTION

1. Field of the Invention

The present invention relates to a motor driving circuit.

2. Description of the Related Art

In electronic devices employing a disk medium such as portable CD (Compact Disc) devices, DVD (Digital Versatile Disc) devices, etc., a brushless DC motor (spindle motor) configured to rotate the disk is employed. In general, a brushless DC motor includes a rotor including permanent magnets and a stator including multiple phase coils connected in a star-winding manner. With such an arrangement, the electric current to be supplied to each coil is controlled so as to excite the coils, thereby rotating the rotor relative to the stator. In general, a brushless DC motor includes a sensor such as a Hall effect sensor, an optical encoder, or the like, in order to detect the rotational position of the rotor. A brushless DC motor is configured to apply a suitable torque to the rotor by switching the current to be supplied to each phase coil according to the position thus detected by the sensor.

In order to further reduce the size of the motor, sensorless motors have been proposed, which are configured to detect the rotational position of the rotor without involving a sensor such as a Hall effect sensor or the like (e.g., see Patent Documents 1 and 2). For example, a sensorless motor monitors the electric potential (which will be referred to as the "midpoint voltage" hereafter) and the back electromotive voltage (induced voltage) that occurs at one terminal of the coil, and detects the zero-crossing point at which the midpoint voltage and the back electromotive voltage thus monitored exhibit the same value.

Furthermore, a voice coil motor is employed to control a head included in a hard disk or the like. While the spindle motor is driven in a switching manner, the voice coil motor is driven in a linear manner.

RELATED ART DOCUMENTS

Patent Documents

[Patent Document 1]
Japanese Patent Application Laid Open No. H03-207250
[Patent Document 2]
Japanese Patent Application Laid Open No. H10-243685
[Patent Document 3]
Japanese Patent Application Laid Open No. H11-75388
[Patent Document 4]
Japanese Patent Application Laid Open No. 2007-312466
[Patent Document 5]
Japanese Patent Application Laid Open No. 2007-312447

SUMMARY OF THE INVENTION

The present invention has been made in view of such a situation. Accordingly, it is an overall purpose of the present invention to provide a motor driving circuit which is capable of driving various kinds of motors.

An embodiment of the present invention relates to a power monitoring circuit. The power monitoring circuit comprises: a first comparator configured to compare a voltage that corresponds to the power supply voltage with a first reference voltage; a first voltage generating unit configured to generate a second reference voltage based upon the first reference voltage; a regulator configured to output a predetermined output voltage; a second comparator configured to compare the output voltage of the regulator with the second reference voltage; a first switch configured to output the power supply voltage in one of a case in which the power supply voltage is lower than the first reference voltage and a case in which the output voltage of the regulator is lower than the second reference voltage, and further configured to output a ground electric potential in a case in which the power supply voltage is higher than the first reference voltage and the output voltage of the regulator is higher than the second reference voltage; a constant current source configured to output a predetermined current; a second switch connected to the constant current source, and configured to switch on and off according to the output of the first switch; and a capacitor connected to a node that connects the constant current source and the second switch.

With an embodiment, when the first switch outputs the power supply voltage, the second switch may be turned on. Furthermore, when the first switch outputs the ground electric potential, the second switch may be turned off.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is a terminal table for the motor driving circuit 100 shown in FIG. 1;

FIG. 5 is a table which shows the relation between the current limiting signal CL and the current;

FIG. 22 is a table which shows the relation between the register SSG and the gain of a second amplifier;

FIG. 24 is a table which shows the relation between AMS data and the selected channel of the analog multiplexer;

FIG. 27 is a table for describing each symbol and the value thereof shown in FIGS. 26A and 26B;

FIG. 28 is a table which shows a serial register address map for the serial interface;

FIG. 29 is a table which shows a serial register map for the serial interface;

FIGS. 30A through 30C are tables for defining the port 0 through the port 2;

FIGS. 31A through 31C are tables for defining the port 3 through the port 5;

FIGS. 32A through 32C are tables for defining the port 6 through the port 8;

FIGS. 33A through 33C are tables for defining the port 9 through the port 11;

FIGS. 34A through 34C are tables for defining the port 15 through the port 17;

FIGS. 35A through 35C are tables for defining the ports 20 and 21 and the power save mode (MODE); and FIG. 36 is a table which shows the relation between data FGS and an FG pulse output from the SPM driver.

DETAILED DESCRIPTION OF THE INVENTION

Figure 1:
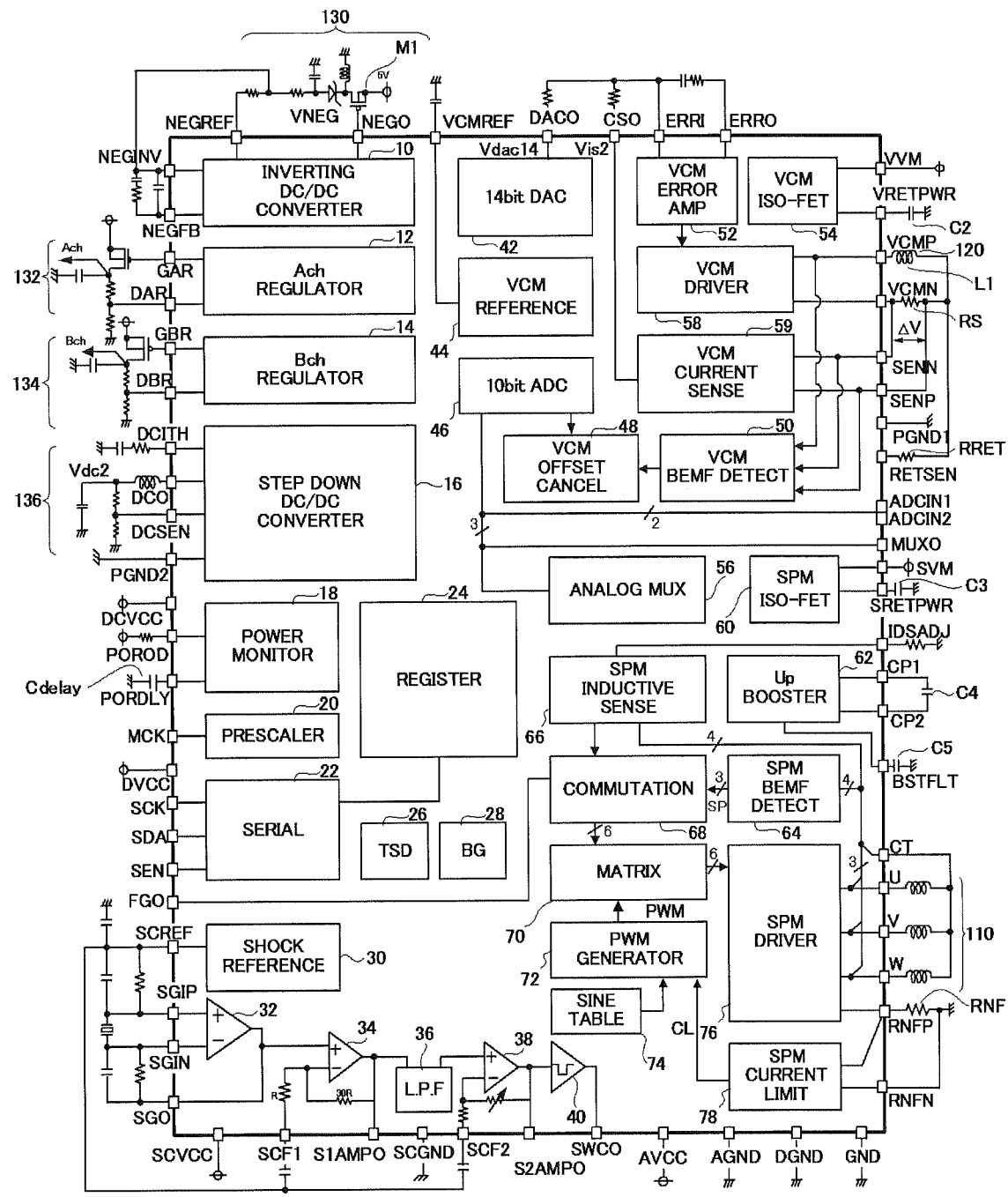
FIG. 1 is a block diagram which shows a configuration of a motor driving circuit according to an embodiment.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, a state represented by the phrase "the member A is connected to the member B" includes a state in which the member A is indirectly connected to the member B via another member that does not affect the electric connection therebetween, in addition to a state in which the member A is physically and directly connected to the member B.

Similarly, a state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

FIG. 1 is a block diagram which shows a configuration of a motor driving circuit 100 according to an embodiment. FIG. 2 is a diagram which shows a terminal table for the motor driving circuit 100 shown in FIG. 1. In the present specification, the name of a terminal will be used as the name of a signal that occurs at that terminal, except in a special case. Specifically, voltage that occurs at a VVM terminal will be referred to as "VVM voltage" or as a "VVM signal".

The motor driving circuit 100 shown in FIG. 1 supplies a driving current to a spindle motor (SPM) 110 and a voice coil motor (VCM) 120 so as to control the rotations thereof. With the present embodiment, the SPM 110 to be driven is configured as a three-phase DC motor including a U-phase coil, a V-phase coil, and a W-phase coil.

The components of the motor driving circuit 100 are roughly classified into: 1. an SPM driver, 2. a VCM driver, 3. a power supply circuit, 4. a shock detection circuit, 5. an interface circuit, and 6. other circuits. Description will be made below regarding each of these components in turn.

1. SPM Driver

The SPM driver includes an SPM isolation FET 60, a booster circuit 62, a back electromotive voltage detection circuit (BEMF detection circuit) 64, an induced voltage detection circuit 66, a commutation circuit 68, a matrix circuit 70, a PWM generator 72, a waveform table 74, an SPM driver 76, and a current limiting circuit 78.

A capacitor C3 is provided to a retraction terminal (SRETPWR terminal) on the SPM 110 side. The SPM isolation FET 60 is arranged between a power supply terminal (SVM terminal) and the SRETPWR terminal on the SPM 110 side.

Figure 3:
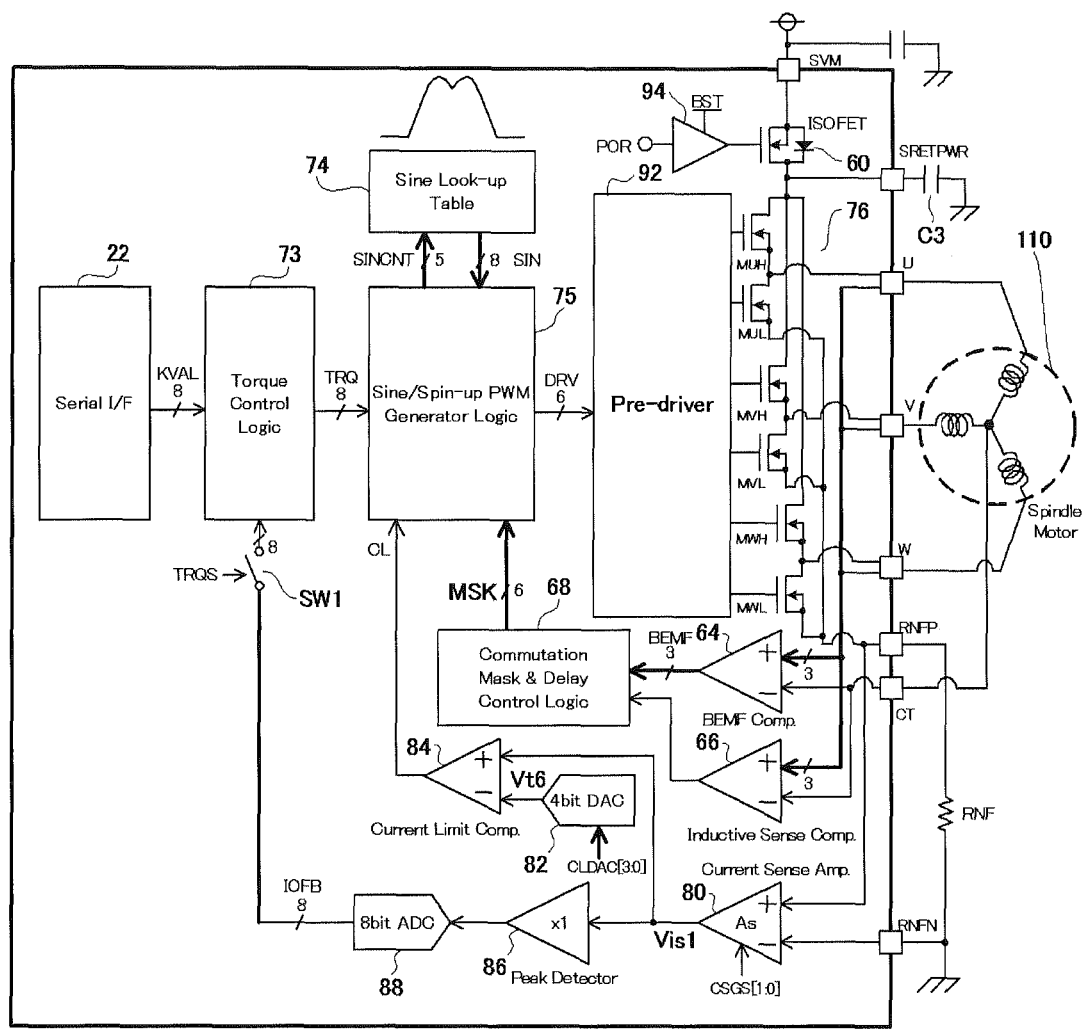
FIG. 3 is a block diagram which shows a configuration of an SPM driver in detail.

FIG. 3 is a block diagram which shows a configuration of the SPM driver in detailed. The SPM driver includes a high-side transistor MUH and a low-side transistor MUL connected to one terminal U of the U-phase coil, a high-side transistor MVH and a low-side transistor MVL connected to one terminal V of the V-phase coil, and a high-side transistor MWH and a low-side transistor MWL connected to one terminal of the W-phase coil.

The drains of the high-side transistors MUH, MVH, and MWH are connected to the SRETPWR terminal. The capacitor C3 is connected to the SRETPWR terminal. The SPM isolation FET 60 is arranged between the SRETPWR terminal and the SVM terminal. The SPM isolation FET 60 is configured as an N-channel MOSFET, and the back gate thereof is connected to the SVM terminal side. Accordingly, the body diode of the SPM isolation FET 60 is formed such that the cathode thereof is formed on the SRETPWR terminal side. An SPMFET driver (cutoff circuit) 94 switches on and off the SPM isolation FET 60 according to a power-on reset signal (POR signal). Specifically, when the POR signal is switched to low level in the shutdown operation and the electric potential at the capacitor C3 (and C2) connected to the retraction terminal (SRETPWR terminal) is higher than the electric potential at the power supply terminal (SVM terminal), the SPMFET driver 94 turns off the SPM isolation FET 60.

The high-side transistors and the low-side transistors are each configured as an N-channel MOSFET. In order to switch on and off the high-side transistor configured as an N-channel MOSFET, there is a need to set the gate voltage thereof to a voltage which is higher than the power supply voltage.

The booster circuit 62 shown in FIG. 1 is configured as a charge pump circuit having a gain of 2. The booster circuit 62 boosts the power supply voltage VCC using a capacitor C4 arranged between two capacitor terminals (CP1 terminal and CP2 terminal) and a capacitor C5 connected to a booster terminal (BSTFLT terminal). The high-side transistors MUH, MVH, and MWH, and the VCM isolation FET 54 are driven using the voltage BST thus boosted.

A pre-driver 92 drives each transistor included in the SPM driver 76. The pre-driver 92 shown in FIG. 3 corresponds to the matrix circuit 70 shown in FIG. 1.

The sources of the low-side transistors MUL, MVL, and MWL of the three phases, shown in FIG. 3, are connected together so as to form a common source terminal which is connected to a detection resistor terminal (RNFP terminal). A detection resistor RNF is arranged between the RNFP terminal and the ground terminal.

The waveform table 74 holds data which defines a current waveform to be supplied to the coils included in the SPM 110. The PWM generator 72 reads out the waveform data from the waveform table 74, and generates a PWM signal having a duty ratio which changes according to the waveform thus read out.

The midpoint electric potential that occurs at the center tap (CT) of the three phase coils is input to a CT terminal. The electric potentials that occur at the U terminal, the V terminal, the W terminal, and the CT terminal, are input to the BEMF detection circuit 64 and the induced voltage detection circuit 66.

The BEMF detection circuit 64 includes comparators (not shown) respectively provided to the three phases, i.e., the U phase, the V phase, and the W phase. These comparators compare the midpoint electric potential that occurs at the CT terminal with the electric potentials at the U terminal, the V terminal, and the W terminal, respectively, so as to detect the zero-crossing points. The back electromotive force detection signals (which will be referred to as the "BEMF signals" hereafter), each of which represents a corresponding comparison result, have cycles (frequencies) that correspond to the rotational speed of the SPM 110. The BEMF signals are input to the commutation circuit 68.

The induced voltage detection circuit 66 compares each of the electric potentials that occur at the U terminal, V terminal, and W terminal, with the midpoint voltage that occurs at the CT terminal. The comparison result obtained by the induced voltage detection circuit 66 is input to the commutation circuit 68.

The commutation circuit 68 generates a window signal WINDOW based upon the signals thus input. In order to compare the voltage that occurs at the CT terminal with the voltages that occur at the U terminal, V terminal, and W terminal, there is a need to set the phase terminal to be compared to the high-impedance state so as to generate a voltage that corresponds to the back electromotive force. That is to say, before detection of the zero-crossing point, the transistor connected to the phase terminal must be turned off. The window signal WINDOW is a signal which determines the period of time for which the corresponding transistor is to be turned off before detection of the zero-crossing point of the SPM 110.

The current limiting circuit 78 shown in FIG. 1 monitors the voltage drop that occurs at the detection resistor RNF, and limits the current that flows through the SPM 110. Specifically, if the voltage drop exceeds a predetermined threshold value, the current limiting circuit stops the current supply to the SPM 110 for a predetermined period of time.

The current limiting circuit 78 shown in FIG. 1 includes a current detection amplifier 80, a DAC 82, and a current limiting comparator 84 shown in FIG. 3. The current detection amplifier 80 amplifies the voltage drop that occurs at the detection resistor RNF, and outputs a voltage Vis1 that corresponds to the voltage drop. The DAC 82 converts a 4-bit control signal CLDAC [3:0] into an analog threshold voltage Vt6. The current limiting comparator 84 compares the output voltage Vis1 of the current detection amplifier 80, and generates a current limiting signal CL.

The current limiting signal CL is input to the PWM generator 72. When the current limiting signal CL is switched to high level, the PWM generator 72 fixes the PWM signal at the low level for a predetermined period of time Toff. The OFF period Toff is on the order of 10 μs. When the PWM signal is the low level, all the transistors included in the SPM driver 76 are turned off, thereby cutting off the coil current that flows through the SPM 110.

Figure 4:
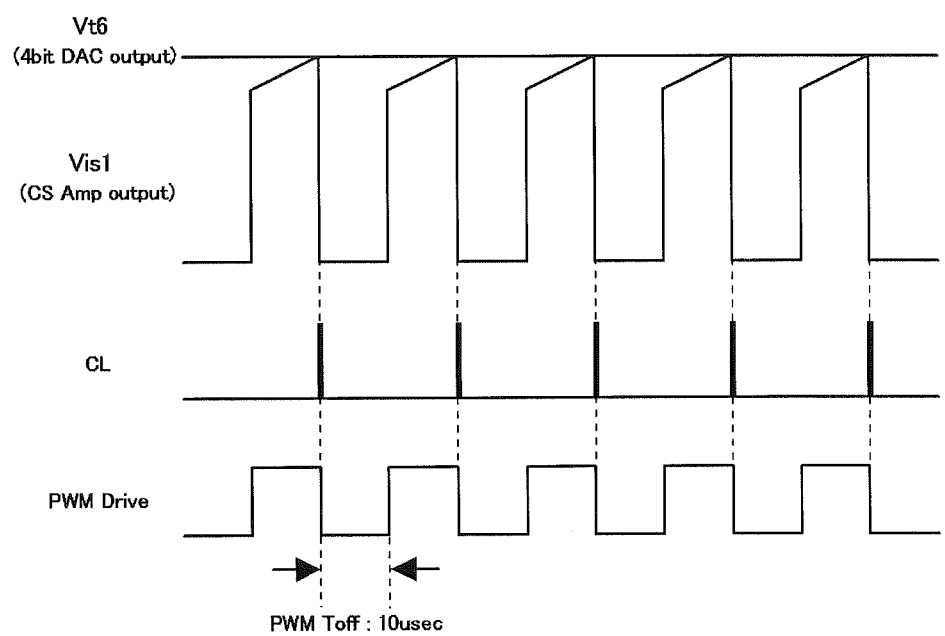
FIG. 4 is a time chart which shows an operation of a current limiting circuit.

FIG. 4 is a time chart which shows the operation of the current limiting circuit 78. In a case in which the rotational speed of the SPM 110 is raised to the target value from its stopped state, immediately after the commencement of rotation instead of the PWM driving operation according to a sinusoidal waveform, the SPM 110 is driven according to the current limiting signal CL. Thus, with such an arrangement, the target rotational speed can be approached speedily.

FIG. 5 is a diagram which shows the relation between the current limiting signal CL and the peak current.

Returning to FIG. 3, the output voltage Vis1 of the current detection amplifier 80 is input to an A/D converter (ADC) 88 via a peak detector 86. The ADC 88 converts the voltage Vis1 into an 8-bit digital signal (output current feedback signal IOFB). The output current feedback signal IOFB is input to a torque control logic unit 73 via a switch SW1. The ON/OFF operation of the switch SW1 is controlled according to a control signal TRQS. The torque control logic unit 73 shown in FIG. 3 is shown as a portion of the PWM generator 72 shown in FIG. 1.

The torque control logic unit 73 receives, as an input signal from an external host processor, an 8-bit digital signal KVAL which represents the toque. The torque control logic unit 73 generates an 8-bit torque signal TRQ according to the torque setting signal KVAL, and, as necessary, according to the output current feedback signal IOFB.

A portion of the PWM generator 72 and a portion of the matrix circuit 70 shown in FIG. 1 are shown simply as a PWM generator 75. The PWM generator 75 includes an internal counter, and outputs a 5-bit count value SINCNT to the waveform table 74. The value SIN addressed according to the count value SINCNT is read out from the waveform table 74, and the value SIN thus read out is input to the PWM generator 75.

The PWM generator 75 generates a PWM signal having a duty ratio which changes according to the value of the waveform signal SIN, combines the PWM signal thus generated with the window signal WINDOW, and outputs the resulting signal to the pre-driver 92 provided in the form of a downstream component.

Figure 6:
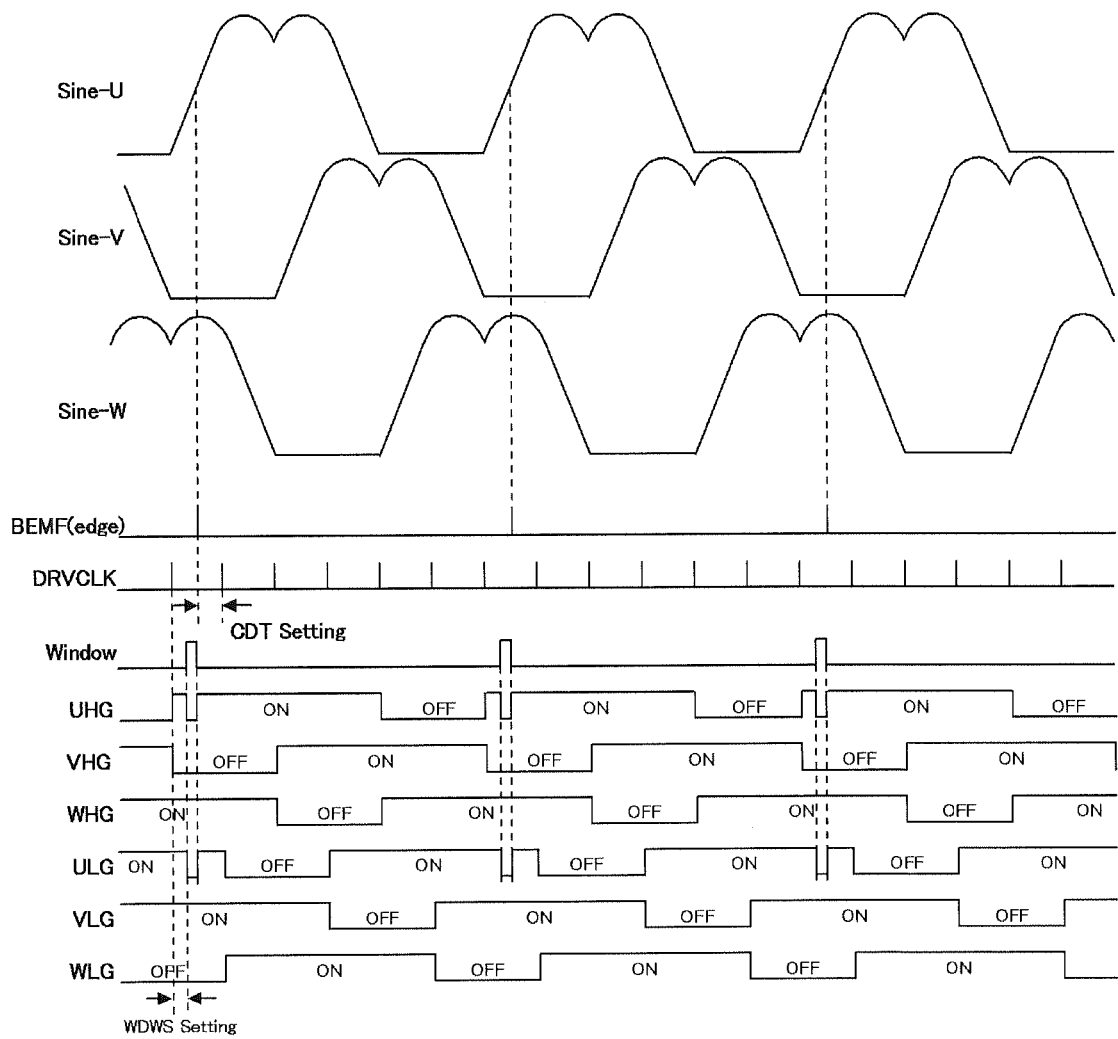
FIG. 6 is a time chart which shows the driving states in increments of phases of the SPM driver.

Description will be made regarding the operation of the SPM driver having the above-described configuration. FIG. 6 is a time chart which shows the driving states in increments of the phases of the SPM driver. The gate voltages of the transistors MUH, MHL, MVH, MVL, MWH, and MWL are denoted by UHG, VHG, WHG, ULG, VLG, and WLG, respectively. The high level represents ON, and the low level represents OFF.

The time chart shown in FIG. 6 shows an arrangement in which the SPM driver detects the zero-crossing point (which is also referred to as "BEMF detection") only with respect to the U phase, and generates a BEMF signal. A driving clock DRVCLK is generated by dividing the interval between the zero-crossing points, i.e., by dividing the 360° of the conduction angle into six regions.

The commutation circuit 68 receives, as an input signal, delay data CDT via a serial interface. The commutation circuit 68 shifts the phase of the driving clock DRVCLK from the timing of the BEMF signal by a delay time that corresponds to the delay data CDT.

A register AVES[1:0] determines a smoothing gain used to perform detection of the BEMF of the SPM 110. When the register AVES[1:0] values are [00], [01], [10], and [11], it indicates that the smoothing operation is to be performed once, twice, four times, and eight times, respectively, and the average value obtained by performing the smoothing operation for the established number of times is used as the BEMF detection data.

With such an arrangement, in a case in which the U phase, of which the BEMF is to be detected, is driven, whenever a period of time determined by the setting data SDWS elapses, the window signal WINDOW is set to high level. During a period of time in which the window signal WINDOW is high level, the transistors MUH and MUL for the U phase are turned off, and accordingly, a back electromotive voltage occurs at the U terminal. The back electromotive voltage thus generated is compared with the voltage at the center tap CT.

Figure 7:
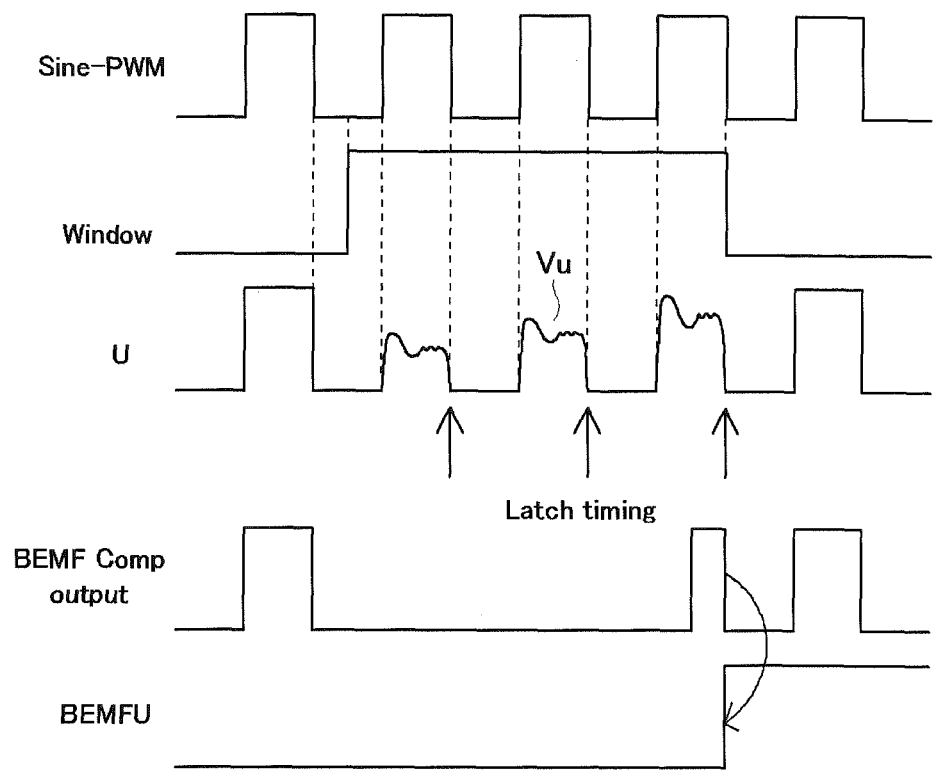
FIG. 7 is a time chart which shows a PWM driving operation in the BEMF detecting operation for the U phase.

FIG. 7 is a time chart which shows the PWM operation at the time of the U phase BEMF detection operation. FIG. 7 shows, in the following order from the top, the PWM signal that corresponds to the sinusoidal waveform, the window signal WINDOW, the back electromotive voltage Vu at the U phase, the output of the zero-crossing point detection comparator, and the BEMF signal.

After the window signal WINDOW is set to the high-level state, the voltage that corresponds to the back electromotive force (which will be referred to as the "back electromotive voltage" hereafter) occurs at the U terminal. The output of the comparator represents the comparison result obtained by comparing the back electromotive voltage Vu at the U phase with the voltage that occurs at the center tap CT. As shown in the drawing, noise is superimposed on the back electromotive voltage Vu at a timing at which the PWM signal is switched to high level. In order to prevent misdetection of the zero-crossing point timing due to this noise component, the output of the BEMF comparator is latched using a negative edge of the PWM signal. When the output signal of the BEMF comparator is high level at a negative edge timing of the PWM signal, the BEMF signal at the U phase is set to high level. Upon receiving the high level BEMF signal for the U phase, the window signal WINDOW is set to low level.

With such an operation described above, the SPM 110 is driven smoothly.

2. VCM Driver

Returning to FIG. 1, the VCM driver is a block configured to drive the VCM 120 in a linear manner. The VCM driver is configured as a class AB voltage amplifier, and includes an H-bridge output stage. The VCM driver includes a DAC 42, a VCM reference circuit 44, an ADC 46, an offset canceling circuit 48, a BEMF detection circuit 50, an error amplifier 52, a VCM isolation FET 54, and an analog multiplexer 56.

Figure 8:
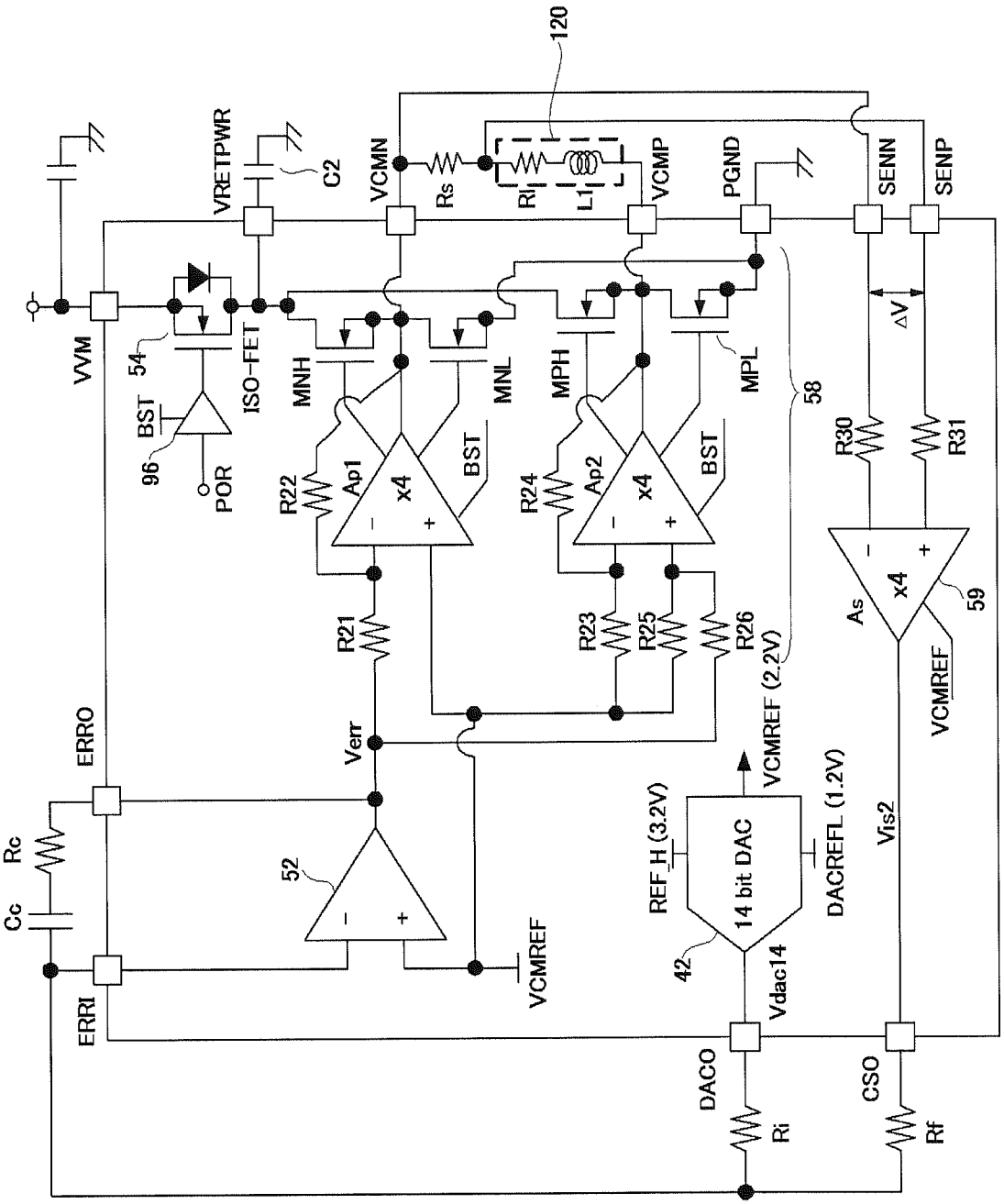
FIG. 8 is a circuit diagram which shows a configuration of a VCM driver in detail.

FIG. 8 is a circuit diagram which shows a configuration of a VCM driver in detail.

The VCM 120 and a resistor Rs used to detect a current are connected in series between both terminals (VCMP terminal and VCMN terminal) of the VCM 120. A voltage drop $\Delta V$ which is proportional to the current that flows through the coil L1 occurs at the resistor Rs. The voltage difference between both terminals of the resistor Rs is input to the sense terminals (SENN terminal and SENP terminal). That is to say, the voltage difference $\Delta V$ between the SENN terminal and the SENP terminal is proportional to the coil current.

A VCM current detection circuit 59 detects the coil current based upon the voltage difference $\Delta V$ between the SENN terminal and the SENP terminal. The VCM current detection circuit 59 is configured as an amplifier with a gain of 4. The detection voltage Vis2 that corresponds to the coil current is output via a terminal CSO. The DAC 42 converts a digital signal (not shown) which indicates the torque (rotational speed) of the VCM 120 into an analog torque control voltage Vdac14, and outputs the analog torque control voltage Vdac14 thus converted via a terminal DACO. The detection voltage Vis2 and the torque control voltage Vdac14 are input to an input terminal ERRI of the error amplifier 52 via resistors Rf and Ri, respectively. A capacitor Cc and a resistor Rc, which are configured as a phase compensation component, are connected in series between an output terminal ERRO and an input terminal ERRI of the error amplifier 52.

The voltage difference between the torque control voltage Vdac14 and the detection voltage Vis is divided by the resistors Ri and Rf, and the voltage thus divided is input to the error input terminal ERRI, which is configured as an inverting input terminal of the error amplifier 52.

The error amplifier 52 amplifies the difference between a reference voltage VCMREF and a voltage ERRI, thereby generating an error voltage Verr.

The output voltage Verr of the error amplifier 52 is output to the VCM driver 58. The VCM driver 58 supplies a driving voltage that corresponds to the error voltage Verr to the VCMP terminal and the VCMN terminal.

The VCM driver 58 includes transistors MPH, MPL, MNH, and MNL, amplifiers Ap1 and Ap2, and resistors R21 through R26.

The amplifier Ap1 and the resistors R21 and R22 form an inverting amplifier circuit. The reference voltage VCMREF is input to the non-inverting input terminal of the amplifier Ap1. Furthermore, the error voltage Verr is input to the inverting input terminal of the amplifier Ap1 via the resistor R21. The resistor R22 is arranged between the output terminal and the inverting input terminal of the amplifier Ap1. This inverting amplifier inverts and amplifies the error voltage Verr using the reference voltage VCMREF as a bias voltage.

The high-side transistor MNH and the low-side transistor MNL are arranged in a push-pull manner as an output stage of the amplifier Ap1. The connection node that connects the transistors MNH and MNL is connected to one terminal VCMN of the VCM 120.

The amplifier Ap2 and the resistors R23 through R26 form a non-inverting amplifier. The reference voltage VCMREF is input to the inverting input terminal of the amplifier Ap2 via the resistor R23. The voltage difference between the error voltage Verr and the reference voltage VCMREF is divided by the resistors R25 and R26, and the voltage thus divided is input to the non-inverting input terminal of the amplifier Ap2.

As an output stage of the amplifier Ap2, the high-side transistor MPH and the low-side transistor MPL are arranged in a push-pull manner. The connection node that connects the transistors MPH and MPL is connected to one terminal VCMP of the VCM 120.

The drains of the transistors MNH and MPH are connected to a retraction terminal (VRETPWR terminal) on the VCM 120 side. A capacitor C2 is connected to the VRETPWR terminal, and the VCM isolation FET 54 is arranged between the power supply terminal (VVM terminal) and the VRET-PWR terminal on the VCM 120 side. The VCM isolation FET 54 is configured as an N-channel MOSFET, and the back gate thereof is connected to the VVM terminal side. Accordingly, the body diode of the VCM isolation FET 54 is formed such that the cathode thereof is formed on the VRETPWR terminal side. A VCMFET driver 96 switches the state of the VCM isolation FET 54 between the ON state and the OFF state according to a power-on reset signal (POR signal) described later.

Specifically, when the POR signal is switched to the low level in the shutdown operation and the electric potential at the capacitor C3 (and C2) connected to the retraction terminal (SRETPWR terminal) is higher than the electric potential at the power supply terminal (SVM terminal), the VCMFET driver 96 turns off the VCM isolation FET 54.

With the above-described VCM driver, the current Ivcm that flows through the VCM 120 is stabilized at a current represented by Expression Ivcm=Gvcm×Vdac14=(Rf/(4×Ri×Rs))×Vdac14.

Figure 9:
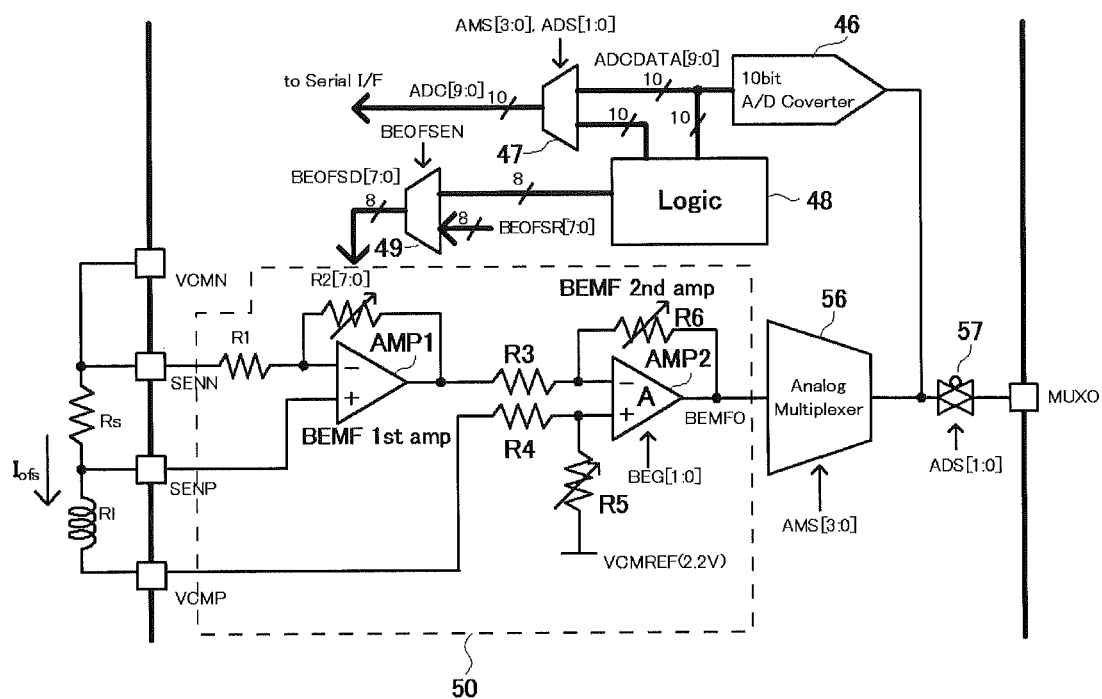
FIG. 9 is a circuit diagram which shows the components around an ADC, an offset canceling circuit, a BEMF detection circuit, and an analog multiplexer shown in FIG. 1.

FIG. 9 is a circuit diagram which shows a configuration around the offset canceling circuit 48, the BEMF detection circuit 50, and the analog multiplexer 56.

With such an arrangement, the BEMF detection circuit 50 detects the back electromotive voltage of the VCM 120 based upon the electric potential at the VCMP terminal, which is one terminal of the coil L1, and the voltage difference between both terminals (SENN terminal and SENP terminal) of the resistor Rs. The level of the back electromotive voltage thus detected is output to the offset canceling circuit 48. The offset canceling circuit 48 eliminates the effects of the parasitic resistance component (RI) that occurs within the VCM 120.

The BEMF detection circuit 50 includes amplifiers AMP1 and AMP2, and resistors R1 through R6. The amplifier AMP1 amplifies the voltage drop that occurs at the detection resistor Rs. The gain of the amplifier AMP1 is determined by the ratio between the resistor R1 and the resistor R2. The resistor R2 is configured as a variable resistor. The resistance value of the resistor R2 is set according to 8-bit control data BEOFSD[7:0].

The voltage difference between the voltage at the VCMP terminal and the 2.2 V reference voltage VCMREF is divided by means of the resistors R4 and R5. The voltage thus divided is input to the non-inverting input terminal of the amplifier AMP2. The amplifier AMP2 inverts and amplifies the output voltage of the amplifier AMP1 using the electric potential at the non-inverting input terminal thereof as a reference voltage. The gain A of the amplifier AMP2 is determined by the ratio between the resistors R3 and R6. The resistors R6 and R5 are each configured as a variable resistor. The gain A of the amplifier AMP2 is switched between gains of 1, 2, 4, and 8, according to 2-bit data BEG[1:0].

The output voltage BEMFO of the amplifier 2 is represented by the following Expression.

$$BEMFO = A \cdot [V_{BEMF}(Iofs \times RI) - (R2/R1) \times Iofs \times Rs] + VCMREF \quad (1)$$

Here, $V_{BEMF}$ represents the back electromotive voltage of the coil L to be measured. Thus, such an arrangement is capable of measuring the voltage BEMFO that corresponds to the back electromotive voltage.

When the relation R2/R1=RI/Rs is satisfied, the aforementioned Expression (1) is simplified to the following Expression (2).

$$BEMFO = A \times V_{BEMF} + VCMREF \quad (2)$$

For example, the resistor R1 is set to 17 kΩ, and the resistance value of the resistor R2 is set according to the control data BEOFSR[7:0] as follows.

$$R2(k\Omega) = 300 \times BEOFSR[7] + 300/2 \times BEOFSR[6] + 300/4 \times BEOFSR[5] + 300/8 \times BEOFSR[4] + 300/16 \times BEOFSR[3] + 300/32 \times BEOFSR[2] + 300/64 \times BEOFSR[1] + 300/128 \times BEOFSR[0]$$

In the state in which the head has been retracted from the surface of the disk, the offset canceling circuit 48 rotates the VCM 120 in the direction in which the hard disk head is to be pressed on the opposite side of the disk. At this time, the head is not moved, and accordingly, the VCM 120 is not rotated. As a result, the back electromotive voltage $V_{BEMF}$ becomes essentially zero. Thus, the offset amount can be calculated based upon the Expression (1).

The voltage BEMFO that corresponds to the back electromotive voltage is input to the 16-channel analog multiplexer 56. The analog multiplexer 56 selects an input signal according to 4-bit control data AMS[3:0]. Detailed description will be made regarding the analog multiplexer 56.

The voltage thus selected by the analog multiplexer 56 is converted by the A/D converter (ADC) 46 into a digital value ADCDATA[9:0].

When the motor driving circuit 100 is mounted on an electrical device, the effective resistance value of the detection resistor Rs is affected by the wiring resistance on a printed-circuit board. That is to say, Expression (2) does not hold true. The offset canceling circuit 48 receives the digital value ADCDATA[9:0], and cancels out the offset effects due to parasitic resistance or the like, so as to generate data ADCOFS[9:0].

A selector 47 selects either the data ADCDATA[9:0] or the data ADCOFS[9:0] according to the control data AMS[3:0] and ADS[1:0]. The data ADC[9:0] thus selected is output to a serial interface 22.

The data BEOFSD[7:0] used to set the resistor R2 can be selected by the selector 49 from either data BEOFSR[7:0] set for the register according to an instruction received from the host processor, or data BEOF[7:0] generated by the offset canceling circuit 48. The selector 49 selects either of the data according to data BEOFSEN.

The above is the configuration of the VCM driver and the operation thereof.

3. Power Supply Circuit

The power supply circuit includes an inverting DC/DC converter 10, a first regulator 12, a second regulator 14, a step-down DC/DC converter 16, and a power monitoring circuit 18.

The step-down DC/DC converter 16 shown in FIG. 1 and an external circuit 136 form a synchronous rectification switching regulator. The step-down DC/DC converter 16 alternately switches on and off a high-side transistor and a low-side transistor included within the step-down DC/DC converter 16, thereby generating a DC voltage Vdc2. The voltage Vdc2 is divided by means of resistors, and the voltage Vdc2 thus divided is fed back to a detection terminal (DCSEN terminal). The duty ratios of the high-side transistor and the low-side transistor are adjusted according to the feedback voltage.

Figure 10:
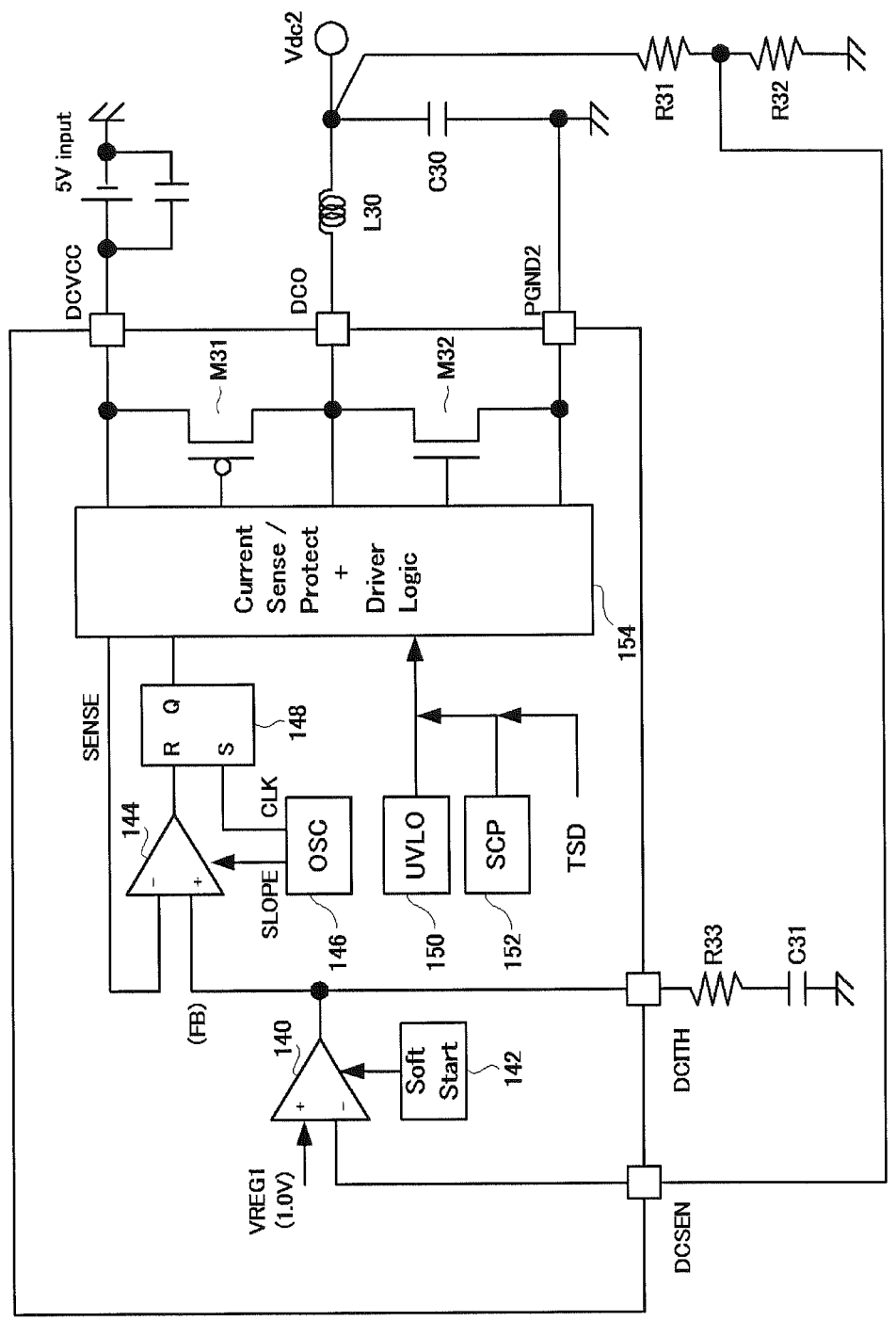
FIG. 10 is a block diagram which shows a configuration of a step-down DC/DC converter.

FIG. 10 is a block diagram which shows a configuration of the step-down DC/DC converter 16. The output voltage Vdc2 is divided by means of resistors R31 and R32, and the voltage Vdc2 thus divided is fed back to the DCSEN terminal. An error amplifier 140 is configured as a conductance amplifier which amplifies the difference between a reference voltage VREG1 and the DCSEN voltage. A DCITH terminal is connected to a resistor R33 and a capacitor C31 in order to convert the output current of the error amplifier 140 into an FB voltage.

$$FB=VCC-DCITH/5$$

A current detection/logic unit 154 converts the current that flows through a coil L30 into a voltage, thereby generating an SENSE voltage. A comparator 144 compares the FB voltage with the SENSE voltage. The comparison result is input to a reset terminal of an RS flip-flop. A clock CLK generated by an oscillator 146 is input to a set terminal of the RS flip-flop 148. The output signal Q of the RS flip-flop 148 is output as a pulse-modulated pulse signal. The oscillator 146 inputs a slope signal to the comparator 144, synchronously with the clock CLK in order to suppress sub-harmonic oscillation.

The current detection/logic unit 154 alternately switches on and off a high-side transistor M31 and a low-side transistor M32 according to a pulse signal output from the RS flip-flop 148.

A soft start circuit 142 generates a voltage which gradually rises in the start-up operation of the step-down DC/DC converter 16. In the start-up operation, the output FB of the error amplifier 140 gradually rises, and thus, the output voltage Vdc2 gradually rises, thereby suppressing in-rush current.

The current detection/logic unit 154 receives error signals from a UVLO (under-voltage lock out) 150, an SCP (short-circuit protection) circuit 152, and a thermal shutdown circuit. If the DCVCC voltage becomes equal to or smaller than 3.5 V, the operation for generating the output voltage Vdc2 is stopped, and if the output terminal is short-circuited to the ground terminal, the SCP 152 is switched to the active state.

The step-down DC/DC converter 16 regulates the output voltage Vdc2 such that the relation Vdc2=(R31/R32+1)× VREG1 is satisfied.

Figure 11:
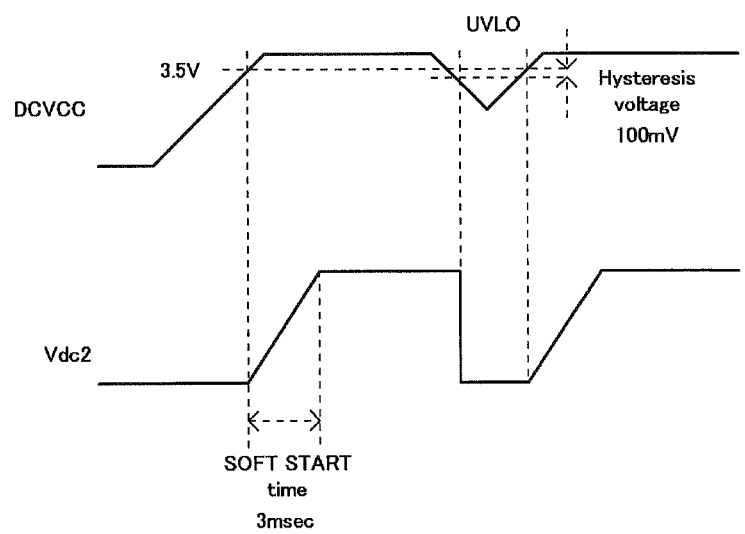
FIG. 11 is a time chart which shows a soft-start operation of the step-down DC/DC converter.

Description will be made below regarding the operation of the step-down DC/DC converter 16 having such a configuration. FIG. 11 is a time chart which shows the soft-start operation of the step-down DC/DC converter 16. Whenever the input voltage DCVCC exceeds 3.5 V, the UVLO is switched to the inactive state, thereby starting the soft-start operation. In the soft-start operation, the output voltage Vdc2 gradually rises for 3 ms. 100 mV hysteresis is applied to the threshold voltage set for the UVLO. Whenever the input voltage DCVCC becomes smaller than 3.4 V, the UVLO is switched to the active state, thereby stopping the operation for generating the output voltage Vdc2.

Figure 12:
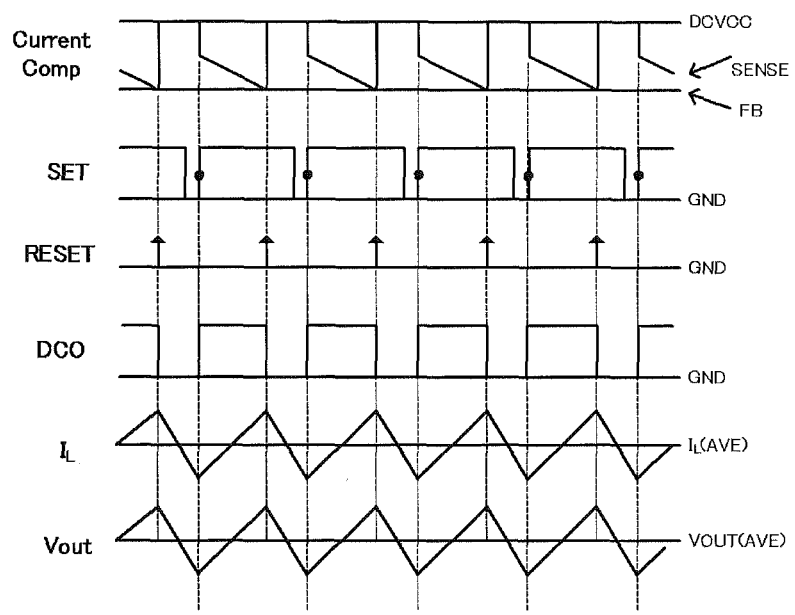
FIG. 12 is a time chart which shows a switching operation of the step-down DC/DC converter.

FIG. 12 is a time chart which shows the switching operation of the step-down DC/DC converter 16.

Returning to FIG. 1, the first step-down regulator 12, together with an external circuit 132, forms a linear regulator, and generates an A-channel output voltage Ach. The A-channel output voltage Ach is divided, and the output voltage Ach thus divided is fed back to a feedback terminal (DAR terminal) of the first regulator 12. The first regulator 12 adjusts the gate voltage of an output transistor M2 according to the feedback voltage, thereby stabilizing the voltage Ach at a target value.

The second regulator 14 has the same configuration as that of the first regulator 12. The second regulator 14, together with an external circuit 134, forms a linear regulator, and generates a B-channel output voltage Bch.

Figure 13:
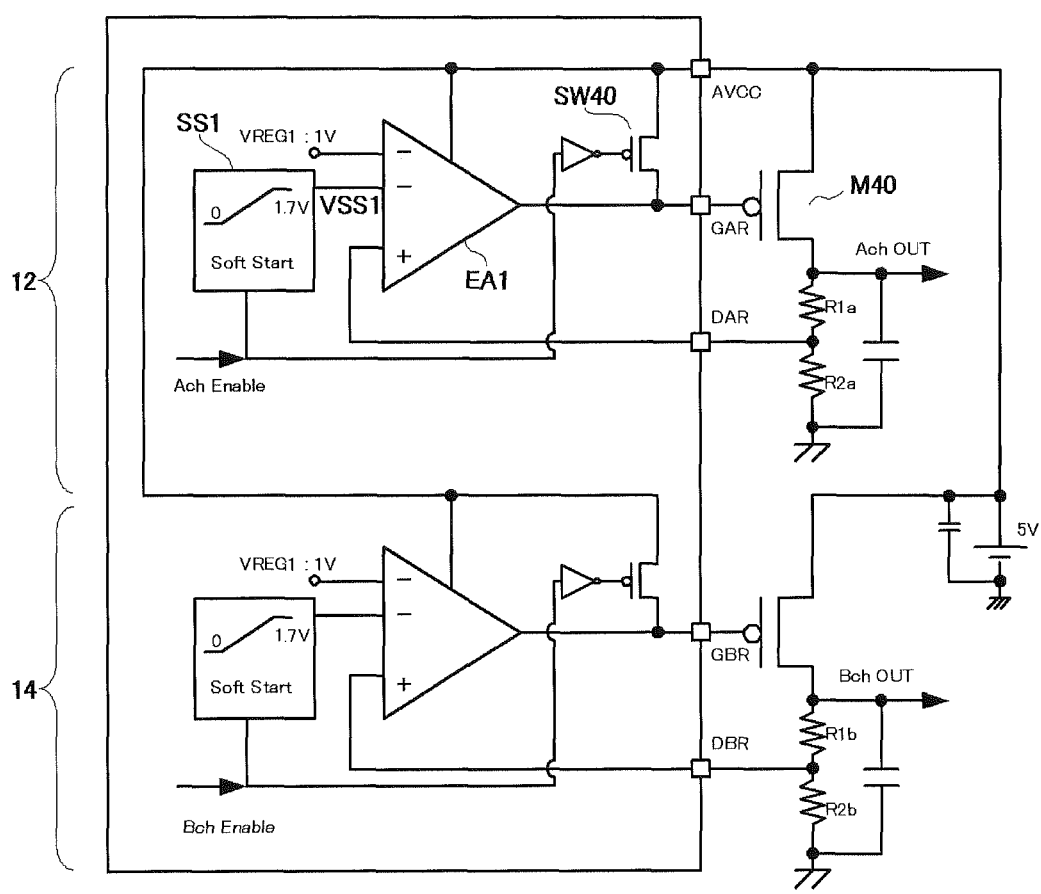
FIG. 13 is a circuit diagram which shows a configuration of a first regulator and a second regulator.

FIG. 13 is a circuit diagram which shows a configuration of the first regulator 12 and the second regulator 14. The first regulator 12 and the second regulator 14 have the same configuration. Accordingly, description will be made only regarding the first regulator 12.

The output voltage Ach of the first regulator 12 is divided by means of resistors R1$a$ and R2$a$, and the output voltage Ach thus divided is fed back to the DAR terminal. The DAR voltage is input to the non-inverting input terminal of an error amplifier EA1. The error amplifier EA1 includes two inverting input terminals. The reference voltage VREG1 is input to one inverting input terminal of the error amplifier EA1. Furthermore, a soft-start voltage VSS1 generated by a soft-start circuit SS1 is input to the other inverting input terminal thereof. The soft start voltage VSS1 rises from 0 V up to 1 V for a period of 100 μs. The soft start voltage VSS1 is clamped at 1.7 V.

The error amplifier EA1 amplifies the difference between the DAR voltage input as a feedback signal and the smaller of the reference voltage VREG1 and the soft-start voltage VSS1. A GAR voltage output from the error amplifier EA1 is input to the gate of a transistor M40. A stabilized voltage Ach is generated at the drain of the transistor M40.

The relation Ach=VREG1×(1+R1$a$/R2$a$) is satisfied.

A switch 40 is arranged between the gate and the source of the transistor M40. The ON/OFF operation of the switch SW40 is controlled according to an enable signal Ach_Enable. Such an arrangement allows the first regulator 12 to switch the state between the ON state and the OFF state according to the enable signal Ach_Enable.

Returning to FIG. 1, the inverting DC/DC converter 10, together with an external circuit 130, forms a voltage inverting type DC/DC converter. The inverting DC/DC converter 10 instructs the switching transistor M1 to perform a switching operation so as to invert the 5 V power supply voltage, thereby generating a negative voltage VNEG. The voltage difference between the negative voltage VNEG and the electric potential at a reference terminal (NEGREF terminal) is divided by means of resistors, and the voltage thus divided is fed back to a feedback terminal (NEGINV terminal). The inverting DC/DC converter 10 adjusts the duty ratio of the switching transistor M1 according to the feedback voltage.

Figure 14:
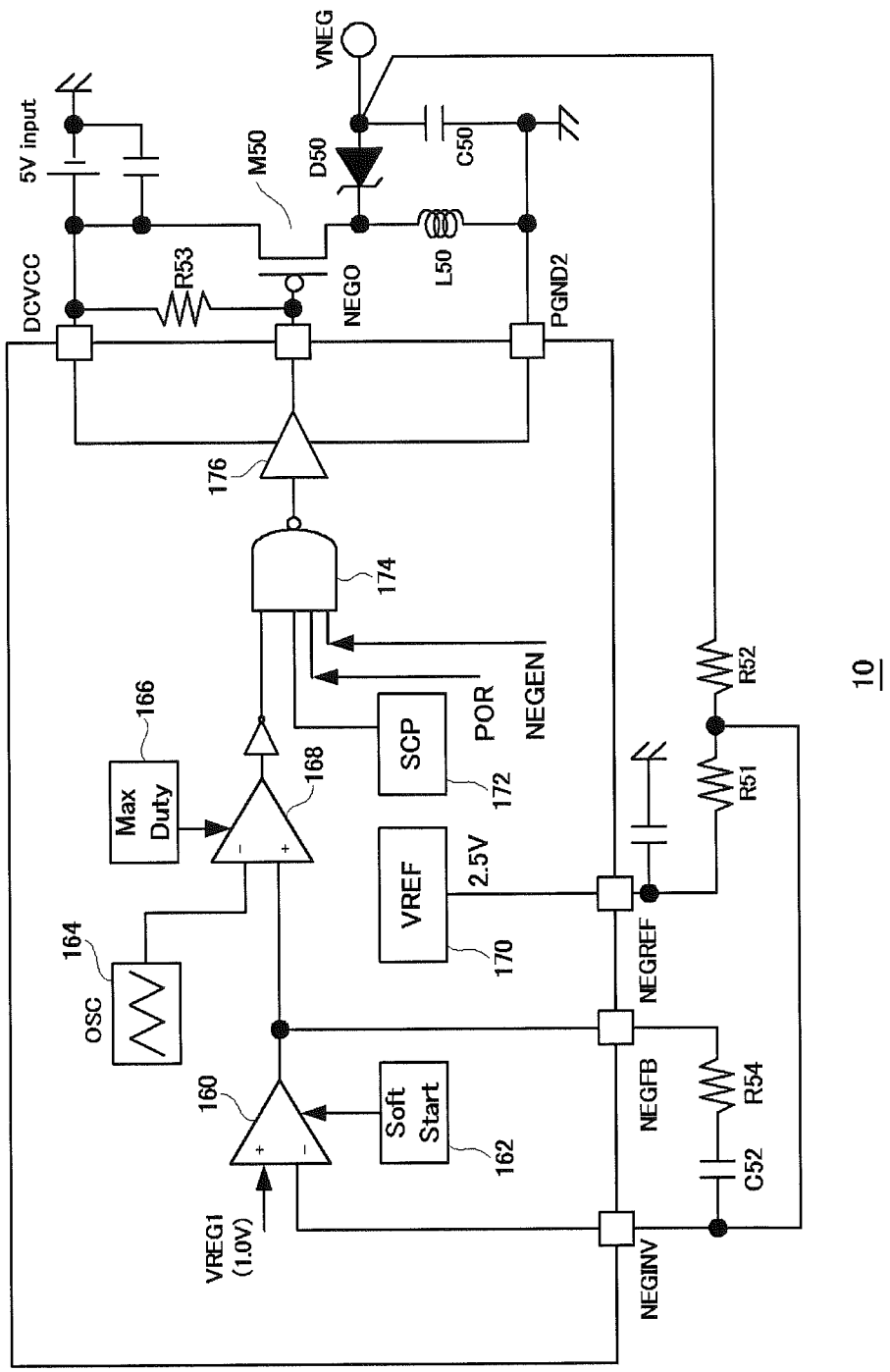
FIG. 14 is a circuit diagram which shows an inverting DC/DC converter.

FIG. 14 is a circuit diagram which shows a configuration of the inverting DC/DC converter 10. The output voltage VNEG of the inverting DC/DC converter 10 is divided by resistors R51 and R52 using the 2.5 V voltage NEGREF generated by a reference voltage source 170 as a reference voltage, and the voltage thus divided is fed back to the NEGINV terminal. An error amplifier 160 amplifies the difference between the 1.0 V reference voltage VREG1 and the NEGINV voltage received as the feedback signal. A capacitor C52 and a resistor R54 are arranged in series between the inverting input terminal and the output terminal of the error amplifier 160. A soft-start circuit 162 controls the error amplifier 160 so as to instruct the inverting DC/DC converter 10 to perform a soft-start operation.

An oscillator 164 generates a 1 MHz triangle wave signal (N_REG_OSC signal). A comparator 168 compares the N_REG_OSC signal with an NEGFB signal, and generates a pulse signal (NEGO signal). A maximum duty setting unit 166 sets an upper limit (90%) for the duty ratio of the pulse signal NEGO.

A short-circuit protection (SCP) circuit 172 detects a short-circuit state (ground fault state) that can occur at the output terminal of the inverting DC/DC converter 10. When the NEGFB voltage drops to at or below a threshold voltage (1 V), the SCP circuit 172 begins to count time. Whenever a predetermined period of time (1 ms) elapses in the short-circuit state, the SCP circuit 172 turns off a transistor M50.

The NEGEN signal is used as an enable signal to control the ON/OFF operation of the inverting DC/DC converter 10. A NAND gate 174 generates the logical NAND of the output signal of the comparator 168, the output signal of the SCP circuit 172, a POR signal, and the NEGEN signal. A driver 176 supplies the pulse signal NEGO to the gate of the transistor M50 according to the output signal of the NAND gate 174. A resistor R53 is arranged between the gate of the transistor M50 and the power supply terminal (DCVCC terminal), which pulls down the gate-source voltage.

Figure 15:
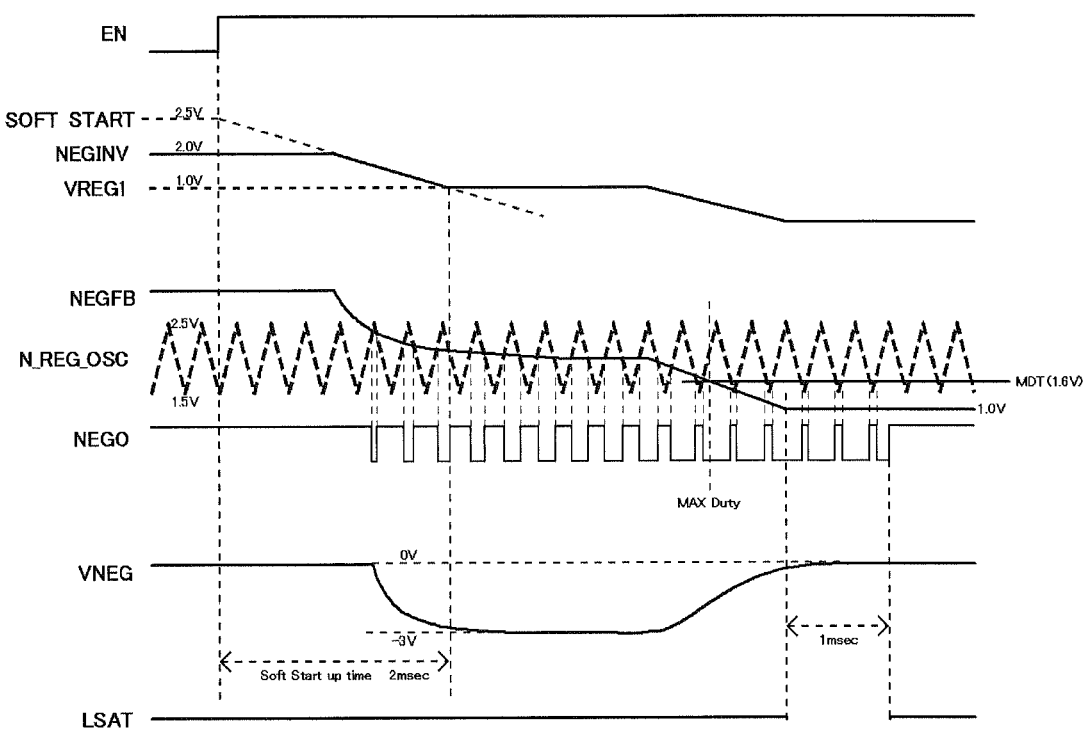
FIG. 15 is a time chart which shows a switching operation of the inverting DC/DC converter.

FIG. 15 is a time chart which shows the switching operation of the inverting DC/DC converter 10. The inverting DC/DC converter 10 operates in flyback mode so as to stabilize the output voltage VNEG thereof at VNEG=1.0−(1.5× R2/R1).

Returning to FIG. 1, the power monitoring circuit 18 monitors the power supply voltage DCVCC of the motor driving circuit 100. The power monitoring circuit 18 is connected to a capacitor C1 provided as an external component. Using the time constant of the capacitor C1, the power monitoring circuit 18 generates, in an open-collector manner, a delayed power-on reset signal POROD, the level of which changes according to the power supply voltage DCVCC.

Figure 16:
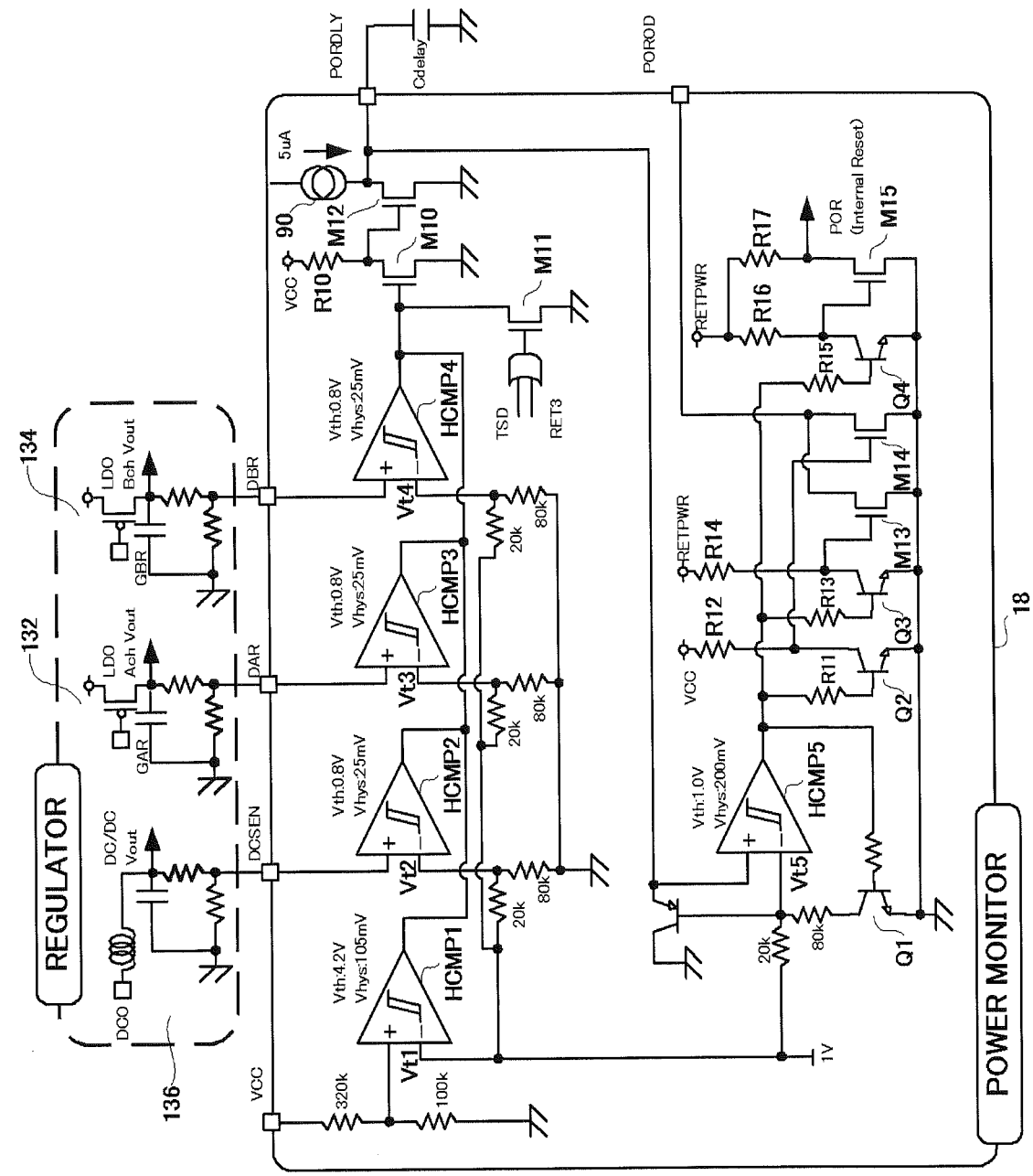
FIG. 16 is a circuit diagram which shows a configuration of a power monitoring circuit.

FIG. 16 is a circuit diagram which shows a configuration of the power monitoring circuit 18. The power monitoring circuit 18 includes multiple hysteresis comparators HCMP1 through HCMP. Threshold voltages Vt1 through Vt3 are input to the inverting input terminals of the hysteresis comparators HCMP1 through HCMP4. Each threshold voltage is generated by dividing the reference voltage (1 V) with a predetermined division ration.

The hysteresis comparator HCMP1 compares the power supply voltage VCC divided by a predetermined ratio with the threshold voltage Vt1.

The hysteresis comparator HCMP2 compares the voltage DCSEN obtained by dividing the output voltage Vdc2 of the step-down DC/DC converter 16 with the threshold voltage Vt2.

The hysteresis comparator HCMP3 compares the output voltage Ach of the first regulator 12 with the threshold voltage Vt3.

The hysteresis comparator HCMP4 compares the output voltage Bch of the second regulator 14 with the threshold voltage Vt4.

The output signals of the hysteresis comparators HCMP1 through HCMP4 are input to the gate of a transistor M10. The transistor M10 is arranged such that the source thereof is grounded, and the drain thereof is pulled up via a resistor R10. A transistor M11 is arranged between the gate of the transistor M10 and the ground. A thermal shutdown signal TSD and a retraction signal RET3 are input to the gate of the transistor M11 via an OR gate OR1.

A discharge transistor M12, a capacitor Cdelay, and a constant current source 90 form a time constant circuit. The capacitor Cdelay is connected to a delayed power-on reset terminal (PORDLY terminal). The constant current source 90 generates a 5 μA constant current so as to charge the capacitor Cdelay. The voltage at the PORDLY terminal is input to the non-inverting input terminal of a hysteresis comparator HCMP5 provided as a downstream component.

The discharge transistor M12 is arranged in parallel with the capacitor Cdelay. When the discharge transistor M12 is turned on, the capacitor Cdelay is discharged, and when the discharge transistor M12 is turned off, the electric potential at the PORDLY terminal rises over time.

The drain voltage of the transistor M10 is input to the gate of the discharge transistor M12.

The output terminals of the hysteresis comparators HCMP1 through HCMP4 are AND-connected, and when at least one hysteresis comparator outputs the low level, the gate of the transistor M10 is set to low level. That is to say, in this case, because the transistor M10 is turned off, and the transistor M12 is turned on. Accordingly, in this case, the electric potential at the PORDLY terminal is fixed in the vicinity of 0 V.

When the hysteresis comparators all output the high level, i.e., when the voltages VCC, DCSEN, DAR, and DBR all exceed the corresponding threshold voltage, the transistor M10 is turned on, and the transistor M12 is turned off. In this state, the charging operation of the capacitor Cdelay is started, whereby the electric potential at the PORDLY terminal rises according to the time constant.

A threshold voltage Vt5 is input to the inverting input terminal of the hysteresis comparator HCMP5 via a 20 kΩ resistor. An 80 kΩ resistor and a transistor Q1 are arranged between the inverting input terminal of the hysteresis comparator HCMP5 and the ground. The base of the transistor Q1 is connected to the output terminal of the hysteresis comparator HCMP5 via a resistor. When the hysteresis comparator CMP5 outputs the high level, the transistor Q1 is turned on, and accordingly, a 1 V voltage is divided by means of the 20 kΩ and 80 kΩ resistors, thereby reducing the threshold voltage Vt5 to 0.8 V.

The output signal of the hysteresis comparator HCMP5 is input to the base of a transistor Q2 via a resistor R11, and is input to the base of a transistor Q3 via a resistor R13. The collector of the transistor Q2 is pulled up to the power supply voltage VCC via a resistor R12. The collector of the transistor Q3 is pulled up to a retraction power supply (RETPWR) via the resistor R13.

The collector voltage of the transistor Q3 is input to the gate of a transistor M13. The collector voltage of the transistor Q2 is input to the gate of a transistor M14. The drains of the transistor M13 and M14 are connected to the POROD terminal.

The output signal of the hysteresis comparator HCMP5 is input to the base of a transistor Q4 via a resistor R15. The collector of the transistor Q4 is pulled up to the retraction power supply RETPWR via a resistor R16. The drain of a transistor M15 is pulled up to the retraction power supply RETPWR via a resistor R17. The collector voltage of the transistor Q4 is input to the gate of the transistor M15. The drain voltage of the transistor M15 is output as the power-on reset signal POR which is used to reset the internal components.

The above is the configuration of the power monitoring circuit 18.

Figure 17A:
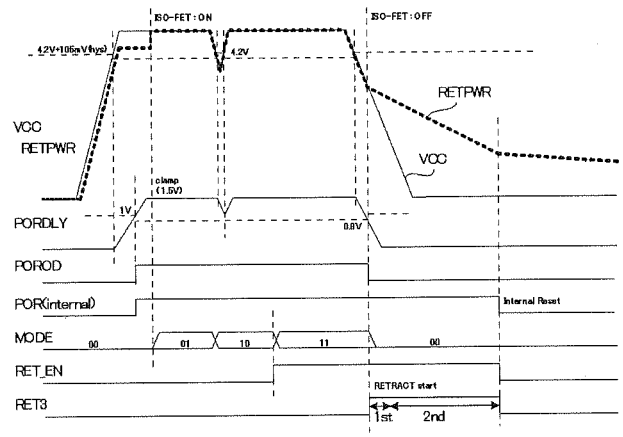
FIGS. 17A through 17C are time charts which each show the operation of the power monitoring circuit.
Figure 17B:
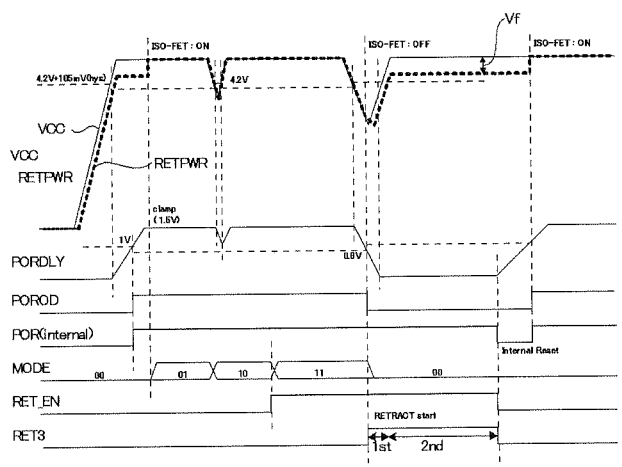
Figure 17C:
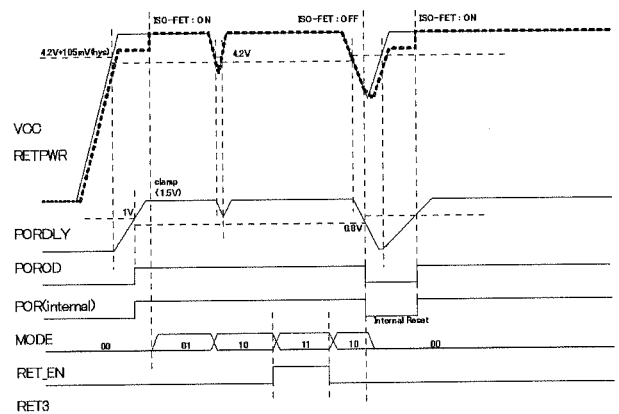

FIGS. 17A through 17C are time charts which each show the operation of the power monitoring circuit 18. FIG. 17A is a time chart showing a case in which the power supply VCC is turned on and a shutdown operation is performed thereafter. FIGS. 17B and 17C are time charts which each show a case in which the system is temporarily shut down after the power supply VCC is turned on, and the system is started up again immediately after the temporary shutdown operation. The difference between the operations shown in the time charts in FIGS. 17B and 17C is the mode setting MODE which is set according to an instruction received from the host processor. The states of each of the components included in the motor driving circuit 100, which are set according to the respective modes, are shown in FIG. 35C.

Next, description will be made regarding the retraction operation in the power shutdown operation.

Description will be made with reference to FIG. 1. In the normal operation state, the SPM isolation FET 60 and the VCM isolation FET 54 are each on, and accordingly, the electric potentials at the SRETPWR terminal and the VRET- PWR terminal are each equal to the power supply voltage VCC. In this state, charge is stored in the capacitors C2 and C3.

In a case in which a hard disk is driven using the motor driving circuit 100, after the power supply voltage VCC for the motor driving circuit 100 is shut down, there is a need to retract a head from the surface of a disk (retraction operation). Accordingly, in order to operate the motor driving circuit 100 after the power supply voltage VCC is shut down, the VCM isolation FET 54 and the SPM isolation FET 60 are turned off so as to disconnect the capacitors C2 and C3 from the power supply voltage VCC. In this state, the VCM 120 is driven using the charge stored in the capacitors C2 and C3 so as to retract the head.

Whenever the power supply voltage VCC is shut down, the power-on reset signal POR is switched to low level, thereby turning off the SPM isolation FET 60 and the VCM isolation FET 54. In this stage, the capacitors C2 and C3 are charged by the induced current that occurs at the coil of the SPM 110. The capacitors C2 and C3 are connected together.

Figure 18:
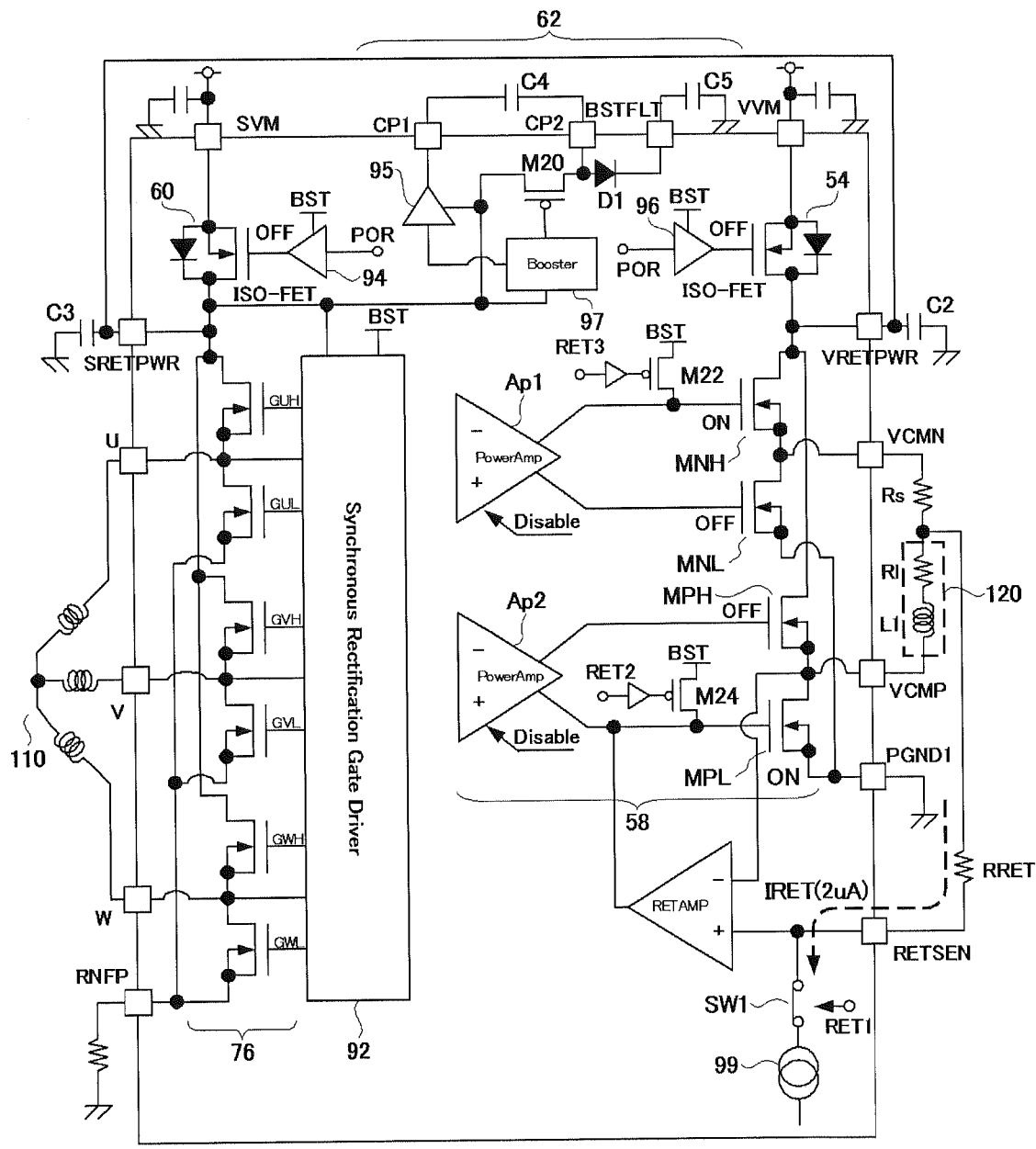
FIG. 18 is a circuit diagram which shows a block configured to execute a retraction operation.

FIG. 18 is a circuit diagram which shows a block configured to execute the retraction operation. In FIG. 18, the labels "ON" and "OFF" each are used to denote the states of each transistor in the retract retraction mode.

A booster circuit 62 includes capacitors C4 and C5, a diode D1, a transistor M20, a buffer 95, and a control circuit 97. The booster circuit 62 boosts the voltage at the SRETPWR terminal with a gain of 2. The booster circuit 62 has a standard configuration, and accordingly, description thereof will be omitted.

The connection node that connects the coil L1 and the detection resistor Rs is connected to a retraction detection terminal RETSEN via a retraction resistor RRET. A switch SW1 and a current source 99 are connected in series to the RETSEN terminal. The switch SW1 is provided in order to control the retraction operation. The ON/OFF operation of the switch SW1 is controlled according to a control signal RET1. When the switch SW1 is turned on, the current source supplies a 2 μA current IRET to the VCM 120, thereby retracting the head.

A retraction amplifier RETAMP amplifies the voltage difference between the electric potential at the VCMP terminal and the electric potential at the RETSEN terminal, i.e., the voltage drop that occurs at the resistor RRET, and supplies the voltage thus amplified to the gate of a transistor MPL.

In order to turn on both the transistors MNH and MPL in the retraction operation, the gate voltage of these transistors must be set to high level, and transistors M22 and M24 are provided in order to ensure such an operation. The transistor M22 is arranged between the gate of the transistor MNH and a booster terminal BST. A retraction signal RET3 is input to the gate of the transistor M22. Similarly, the transistor M24 is arranged between the gate of the transistor MPL and the booster terminal BST. A retraction signal RET2 is input to the gate of the transistor M24. By providing the transistors M22 and M24, such an arrangement is capable of turning on the transistors MNH and MPL even if both the amplifiers AP1 and AP2 are turned off in the shutdown operation of the power supply voltage VCC.

When the system is shut down, the retraction operation is performed according to the POR signal generated by the power monitoring circuit 18 as a trigger signal.

With such an arrangement described above, the following retraction operation is executed.

Figure 19:
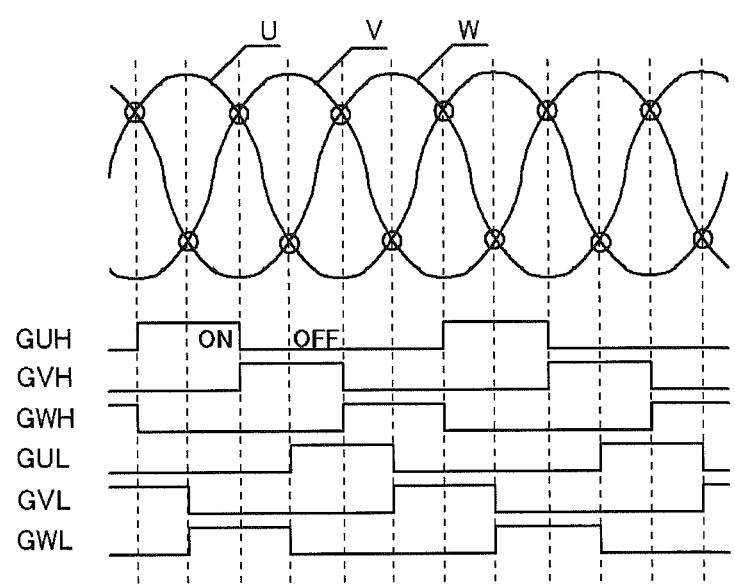
FIG. 19 is a time chart which shows an operation for performing synchronous rectification of the BEMF voltages for the U, V, and W phases.

FIG. 19 is a time chart which shows a step in which the BEMF voltages at the U, V, and W phases are subjected to synchronous rectification. The transistors provided for each phase are switched on and off at a timing at which the respective phase voltage curves intersect. A retraction counter counts the gate signal GUH of the U-phase high-side transistor.

Figure 20:
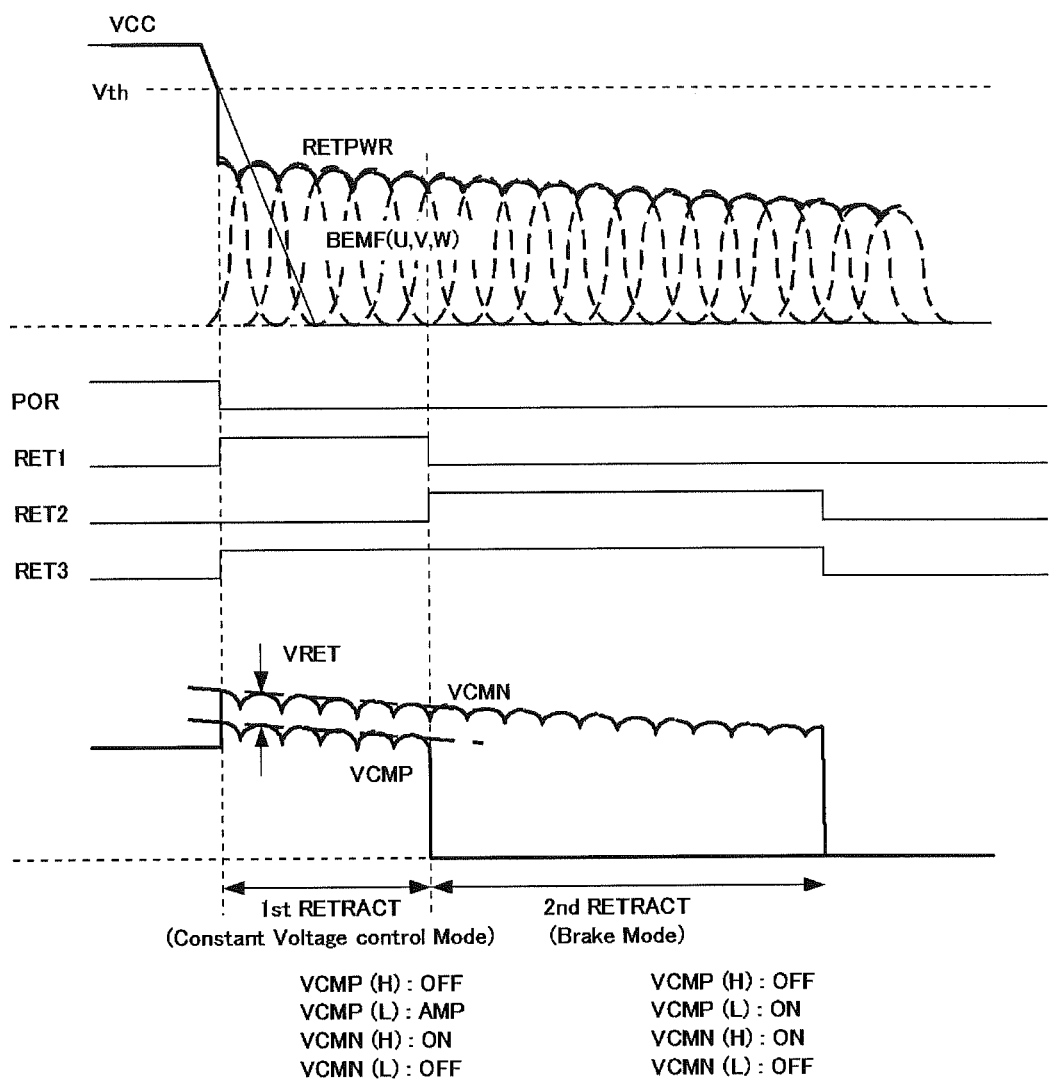
FIG. 20 is a time chart which shows a retraction operation.

The operation in the retraction mode is executed in two steps, i.e., a first step and a second step. FIG. 20 is a time chart which shows the retraction operation. In the first retraction mode (1st RETRACT), the current that flows through the VCM 120 flows from the VCMN terminal to the VCMP terminal. In this state, the high-side transistor MNH of the VCMN terminal side driver is fully turned on. Moreover, the low-side transistor MPL of the VCMP terminal side driver is driven in a linear manner according to the voltage VRET that occurs at the RETSEN terminal.

$$VRET=RRET \times IRET$$

That is to say, the retraction operation is executed while the voltage difference between the VCMN terminal and the VCMP terminal is maintained at VRET.

Subsequently, in the second retraction mode (2nd RETRACT), the low-side transistor MPL of the VCMP terminal side driver is switched from the linear driving mode to the switching driving mode. That is to say, in the second retraction mode, the transistor M24 is turned on, thereby fully turning on the transistor MPL. The second retraction mode will also be referred to as the "brake mode".

The above is the retraction operation.

4. Shock Detection Circuit

Returning to FIG. 1, the shock detection circuit detects vibration of a device mounting the motor driving circuit 100. The vibration detection can be used to generate a start timing or the like, at which a hard disk head is to be retracted.

Figure 21:
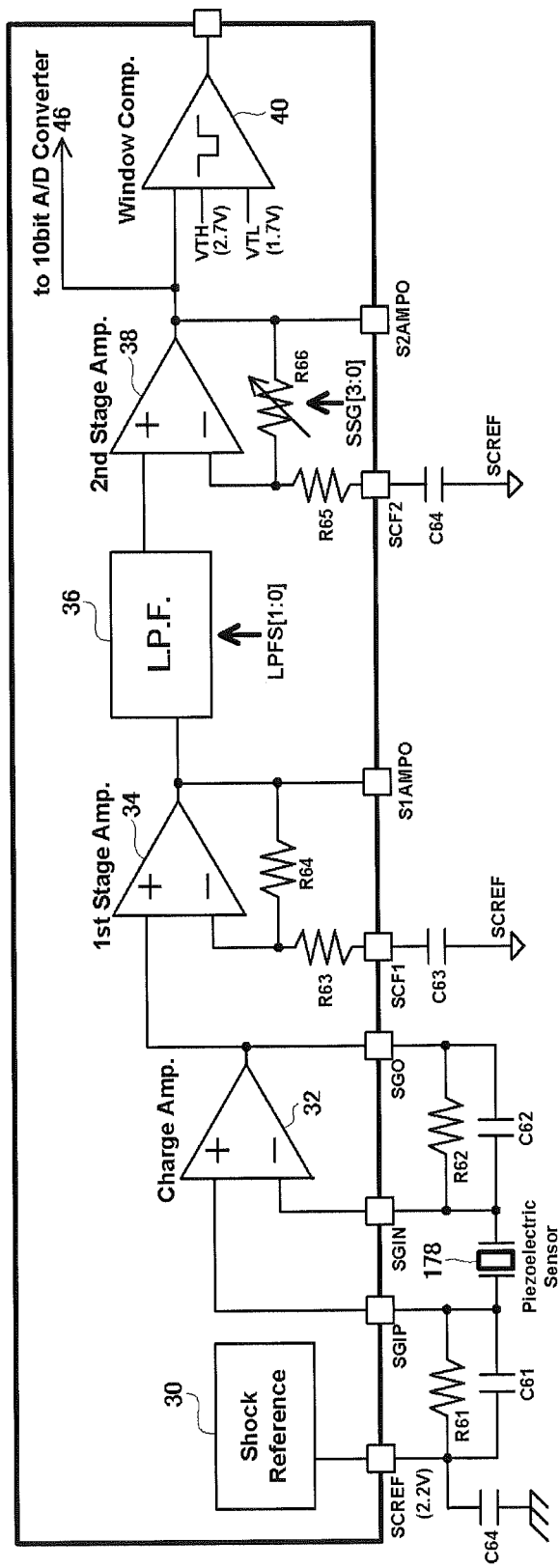
FIG. 21 is a circuit diagram which shows a shock detection circuit.

The shock detection circuit includes a shock reference circuit 30, a charge amplifier 32, a first amplifier 34, a low-pass filter 36, a second amplifier 38, and a window comparator 40. FIG. 21 is a circuit diagram which shows a configuration of a shock detection circuit.

The shock reference circuit 30 generates a 2.2 V reference voltage SCREF. The reference voltage SCREF is input to an SGIP terminal via a resistor R61 and a capacitor C61 arranged in parallel. A piezoelectric element 178, which is configured to convert vibrations into an electrical signal, is arranged between the SIGP terminal and the SGIN terminal. A charge amplifier 32 amplifies the voltage difference that occurs between both terminals of the piezoelectric element 178. A resistor R62 and a capacitor C62 are arranged in parallel between an SGO terminal and the SGIN terminal.

The first amplifier 34 is configured as a non-inverting amplifier. The first amplifier 34 amplifies the output voltage SGO of the charge amplifier 32 with a gain determined by resistors R63 and R64. The output voltage S1AMPO of the first amplifier 34 is input to the low-pass filter 36, thereby removing the high-frequency component from the output voltage S1AMPO. The cutoff frequency Fc is switched according to data LPFS[1:0] stored in a register. The values of the data LPFS[1:0], i.e., [00], [01], [10], and [11], respectively correspond to 5 kHz, 7.5 kHz, 10 kHz, and 12.5 kHz cutoff frequencies fc.

The second amplifier 38 has the same configuration as that of the first amplifier 34. The second amplifier 38 amplifies the output signal of the low-pass filter 36 with a gain determined by resistors R65 and R66. The resistance value of the resistor R66 is set according to a register value SSG[3:0]. FIG. 22 shows a table which represents the relation between the register value SSG and the gain of the second amplifier 38.

The output voltage S2AMPO of the second amplifier 38 is input to a window comparator 40. The window comparator 40 compares the output voltage S2AMPO of the second amplifier 38 with threshold values VTL and VTH. When the degree of vibration is small, the voltage S2AMPO is within a window range between VTL (1.7 V) and VTH (2.7 V). However, whenever the degree of vibration becomes large, the voltage S2AMPO deviates from this window range. That is to say, when the degree of vibration exceeds a predetermined level, the output of the window comparator 40 changes.

The first amplifier 34 and the second amplifier each function as a high-pass filter. The cutoff frequencies fc1 and fc2 are represented by the following Expressions.

$$fc1=1/(2\times\pi\times R63\times C63)$$

$$fc2=1/(2\times\pi\times R65\times C64)$$

The output voltage S2AMPO of the second amplifier 38 represents the amount of vibration. The voltage S2AMPO is input to the ADC 46 via the analog multiplexer 56, thereby converting the voltage S2AMPO into a digital value.

Figure 23:
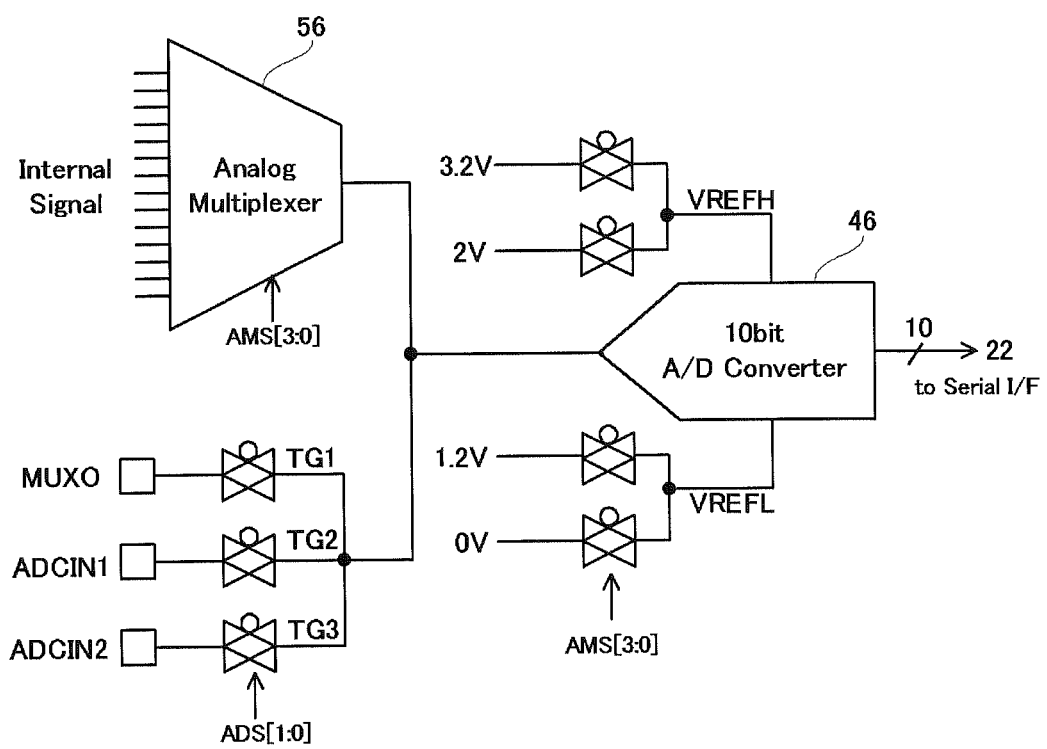
FIG. 23 is a circuit diagram which shows the components around the ADC and the analog multiplexer.

Description will be made below regarding the analog multiplexer 56. FIG. 23 is a circuit diagram which shows the components around the ADC 46 and the analog multiplexer 56. The analog multiplexer 56 includes 16 analog input terminals. Each analog input terminal receives an internal signal of the motor driving circuit 100 as an input signal. The analog multiplexer 56 selects one of the internal signals thus input according to the control signal AMS[3:0], and outputs the internal signal thus selected.

FIG. 24 is a table which shows the relation between the control signal AMS and the selected channel of the multiplexer 56.

The ADC 46 shown in FIG. 23 A/D converts the output signal of the analog multiplexer 56, and outputs the resulting signal to the serial interface 22. The higher reference voltage VREFH to be set for the ADC 46 can be switched between 3.2 V and 2 V. The lower reference voltage VREFL can be switched between 1.2 V and 0 V. The reference voltages VREFH and VREFL can be set according to the control signal AMS[3:0].

The internal signal selected by the analog multiplexer 56 can be output to a circuit external to the motor driving circuit 100 from an MUXO terminal via a transfer gate 57. Furthermore, the ADC 46 is capable of converting the analog voltages input to an ADCIN1 terminal and an ADCIN2 terminal from an external circuit into a digital value, in addition to the output signal of the analog multiplexer 56. Such an arrangement exclusively turns on transfer gates TG1 through TG3. Specifically, when the control signal ADS[1:0] is [00], the transfer gate TG1 is turned on. When the control signal ADS[1:0] is [01], the transfer gate TG2 is turned on. When the control signal ADS[1:0] is [10], the transfer gate TG3 is turned on.

Figure 25:
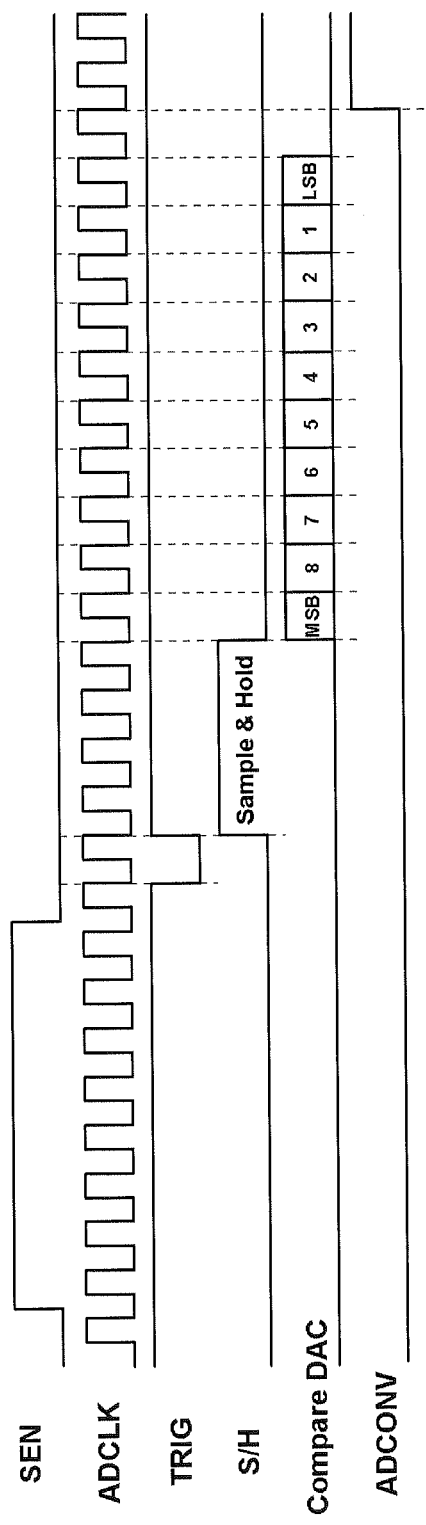
FIG. 25 is a time chart which shows the operation of the ADC.

FIG. 25 is a time chart which shows the operation of the ADC 46. A clock ADCLK is generated based upon a master clock MCLK. The frequency of the clock ADCLK is half the frequency of the master clock. Each positive edge of the SEN signal functions as a start trigger for the A/D conversion operation. Each A/D conversion is completed in 16 clocks.

5. Interface Circuit

Returning to FIG. 1, the interface circuit includes a serial interface 22 and an internal register 24.

The serial interface 22 receives data from an external host processor via a so-called three-line serial bus. The data thus received by the serial interface 22 is written to the internal register 24 at a specified address. Description will be made at the end of this specification regarding the register table.

Figure 26A:
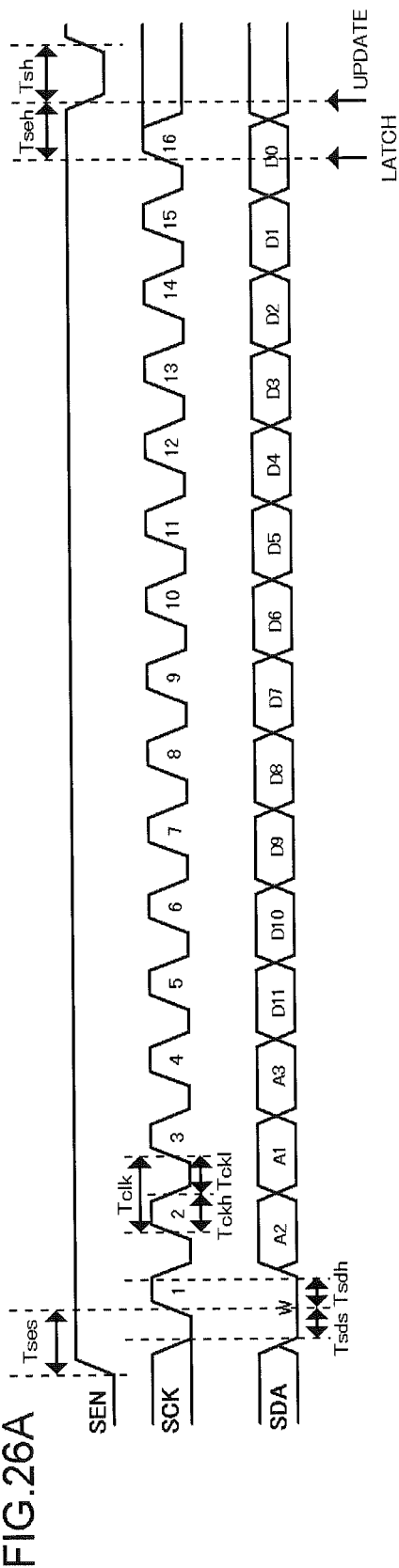
FIGS. 26A and 26B are time charts which show the operation of a serial interface in the write mode and the read mode, respectively.
Figure 26B:
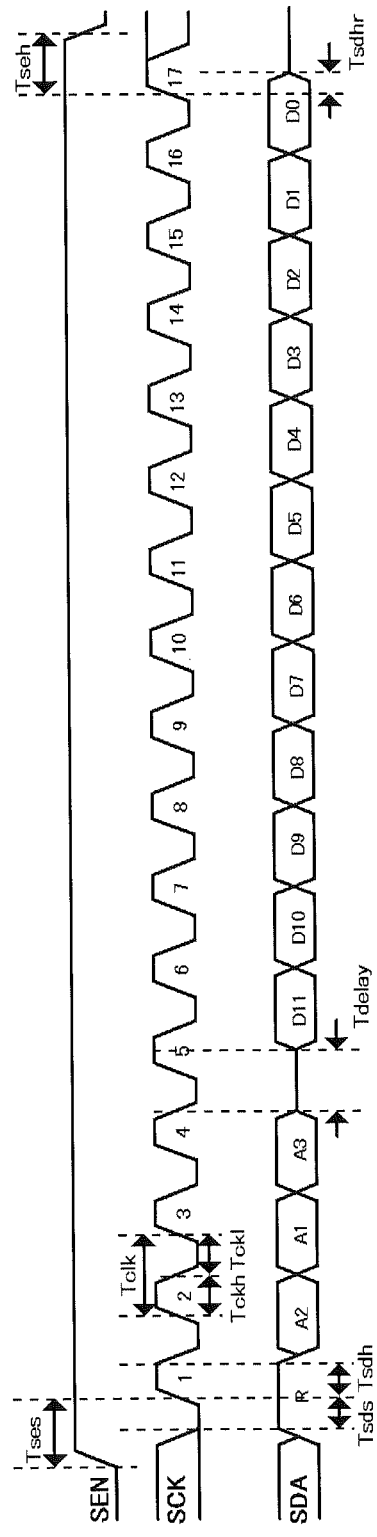

FIGS. 26A and 26B are time charts which show the operation of the serial interface 22 in the write mode and the read mode. When an enable signal SEN is set to the high-level state, the serial interface 22 is enabled. The enable signal SEN is set to the high-level state before the data transmission is started, and is maintained at high level until the data transmission is completed. The enable signal SEN is returned to the low-level state on completion of the data transmission.

When the enable signal SEN is high level, the serially input data SDA is latched at a rising edge of the clock SCK. The data SDA includes 16-bit data packets which comprise a R/W bit which allows the mode to be selected between the write mode and the read mode, a 3-bit address field continuing from the R/W bit, and a 12-bit data-bit field. When the R/W bit is low level, the mode is set to the write mode. When the R/W bit is high level, the mode is set to the read mode. The data writing address or the data readout address is specified according to the next 3 bits or 2 bits of data. The internal register 24 is updated according to the serial data at a timing at which a negative edge of the enable signal SEN is detected (UPDATE).

The data input operation and the data output operation of the internal register 24 require reception of 16 clock SCK pulses in a period of time in which the enable signal SEN is maintained at high level. In a case in which the number of clock SCK pulses thus received is greater than 16, the clock SCK pulses and the data SDA input after the 16-th clock SCK pulse are ignored. In a case in which the enable signal SEN becomes low level before the 16 clocks are received, the data transmitted in this cycle is discarded.

As shown in FIG. 26B, in the data read mode, the R/W bit is selected, and the 3-bit address is assigned. After completion of this step, a three-state buffer (not shown) is enabled according to the negative edge of the fourth clock SCK, and the port data of the internal register 24 is returned to the data SDA. Lastly, the three-state buffer is set to the high-impedance state according to the negative edge of the 16-th clock SCK.

FIG. 27 shows a table for describing each symbol shown in FIGS. 26A and 26B, and the values thereof. FIG. 28 is a table which shows a serial register address map for the serial interface 22. Also, FIG. 29 is a table which shows a serial register map for the serial interface 22.

FIGS. 30A through 30C are tables which define the port 0 through the port 2, respectively. FIGS. 31A through 31C are tables which define the port 3 through the port 5, respectively. FIGS. 32A through 32C are tables which define the port 6 through the port 8, respectively. FIGS. 33A through 33C are tables which define the port 9 through the port 11, respectively. FIGS. 34A through 34C are tables which define the port 15 through the port 17, respectively. FIGS. 35A through 35C are tables which define the ports 20 and 21, and the power save mode (MODE).

The notes for the tables are as follows.

[Note 2]

The first retraction time (RT) and the brake delay time (BDT) are set by an 11-bit internal binary counter. The setting time is calculated based upon the following Expression.

$$RT(s)=BU\times(128\times RT[4]+64\times RT[3]+32\times RT[2]+16\times RT[1]+8\times RT[0]) \quad (3)$$

$$BDT(s)=BU\times(1024\times BDT[2]+512\times BDT[1]+256\times BDT[0]) \quad (4)$$

When BDT[2:0]=[000], the following Expression (5) is applied.

$$BDT(s)=BU\times 2048 \quad (5)$$

$$BU=60/RPM\times(2/Np)$$

Here, NP represents the number of the poles of the motor, and RPM represents the rotational speed.

[Note 3]

The commutation delay setting time is calculated based upon the following Expression (6).

$$CDT(s)=CDT[10:0]\times 16\times Tmck \quad (6)$$

Here, Tmck represents the frequency of the master clock MCLK.

[Note 4]

The BEMF mask setting time is calculated based upon the following Expression.

$$MSK(s)=MSK[11:0]\times 16\times Tmck \quad (7)$$

[Note 5]

The window setting time used to detect the BEMF is calculated based upon the following Expression (8).

$$WDWS(s)=((60/RPM)\times(2/Np)/6/32)\times WDWS[4:0] \quad (8)$$

FIG. 36 is a table which shows the relation between the data FGS[1:0] and the FG pulse output from the SPM driver.

5. Other Circuits

Returning to FIG. 1, a prescaler 20 receives the clock MCK, and uses a variable division ratio to divide the clock MCK thus received so as to generate a clock having a frequency required for the internal components of the motor driving circuit 100.

A thermal shutdown (TSD) circuit 26 monitors the temperature of the motor driving circuit 100 and shuts down the motor driving circuit 100 on detection of an abnormal temperature.

A band gap regulator 28 generates a reference voltage used within the motor driving circuit 100.

Description has been made regarding the present invention with reference to the embodiments. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

The invention claimed is:

1. A motor driving circuit comprising:

a spindle motor driver configured to drive a spindle motor;

a voice coil motor driver configured to drive a voice coil motor;

a switching regulator configured to receive a power supply voltage from an external circuit, and to generate a stabilized voltage;

a linear regulator configured to receive a power supply voltage from an external circuit, and to generate a stabilized voltage;

a shock detection circuit configured to detect vibrations of a device mounting the driving circuit;

a power monitoring circuit configured to monitor the power supply voltage, and to generate a power-on reset signal which is switched to a predetermined level when the power supply voltage is cut off;

an analog/digital conversion circuit configured to convert a back electromotive voltage that occurs at the voice coil motor into a digital signal;

a serial interface configured to receive, from an external host processor, data which is to be used to control the driving circuit; and a cutoff circuit which is arranged between a power supply voltage terminal and a capacitor which is charged using an induced current that occurs at the spindle motor, and which is configured to disconnect the capacitor from the power supply voltage terminal when the power supply voltage is to be cut off.

2. A motor driving circuit according to claim 1, wherein, whenever the power-on reset signal is at a predetermined level, and the voltage at the capacitor is higher than the power supply voltage, the capacitor is disconnected from the power supply voltage terminal.

3. A motor driving circuit according to claim 1, wherein the power monitoring circuit comprises:

a first comparator configured to compare a voltage that corresponds to the power supply voltage with a first reference voltage;

a first voltage generating unit configured to generate a second reference voltage based upon the first reference voltage;

a regulator configured to output a predetermined output voltage;

a second comparator configured to compare the output voltage of the regulator with the second reference voltage;

a first switch configured to output the power supply voltage in one of a case in which the power supply voltage is lower than the first reference voltage and a case in which the output voltage of the regulator is lower than the second reference voltage, and further configured to output a ground electric potential in a case in which the power supply voltage is higher than the first reference voltage and the output voltage of the regulator is higher than the second reference voltage;

a constant current source configured to output a predetermined current;

a second switch connected to the constant current source, and configured to switch on and off according to the output of the first switch; and a capacitor connected to a node that connects the constant current source and the second switch.

4. A power monitoring circuit according to claim 3, wherein, when the first switch outputs the power supply voltage, the second switch is turned on, and wherein, when the first switch outputs the ground electric potential, the second switch is turned off.

* * * * *